United States Patent [19]

Froyd et al.

[11] 4,079,235

[45] Mar. 14, 1978

[54] COMPUTER NUMERICALLY CONTROLLED THREADCUTTING MACHINE TOOL

[75] Inventors: Stanley G. Froyd, San Marino; Theodore R. Wootton, Covina; Wai S. Szeto, LaVerne, all of Calif.

[73] Assignee: McDonnell Douglas Corporation, Long Beach, Calif.

[21] Appl. No.: 754,908

[22] Filed: Dec. 27, 1976

[51] Int. Cl.² .............................................. B23B 1/00
[52] U.S. Cl. .................................... 364/107; 82/1 C; 318/571; 318/573; 364/118; 364/474
[58] Field of Search .................. 235/151.11; 318/569, 318/570, 573, 571

[56] References Cited

U.S. PATENT DOCUMENTS

| | | | |
|---|---|---|---|
| 3,656,377 | 4/1972 | Kosem | 235/151.11 X |
| 3,720,120 | 3/1973 | Cutler | 235/151.11 X |
| 3,725,651 | 4/1973 | Cutler | 235/151.11 |

Primary Examiner—Eugene G. Botz
Attorney, Agent, or Firm—Robert E. Cunha; W. J. Jason; D. L. Royer

[57] ABSTRACT

A computer numerical control system for controlling a lathe or similar machine tool in the cutting of threads. One computer is used as an interpolator to produce speed commands in real time for producing a smooth cutting tool motion. A second computer is used as an axis controller for receiving said speed commands and for controlling the servo circuits of up to six machine tool axes. A resolver attached to the rotating spindle is utilized to synthesize a tachonometric signal, and is also connected to an interrupt circuit to measure the spindle speed and position. The interpolator then uses this spindle information to synchronize the cutting tool motion with the spindle angular speed and position to enable multiple passes of the cutting tool along the same thread line.

10 Claims, 25 Drawing Figures

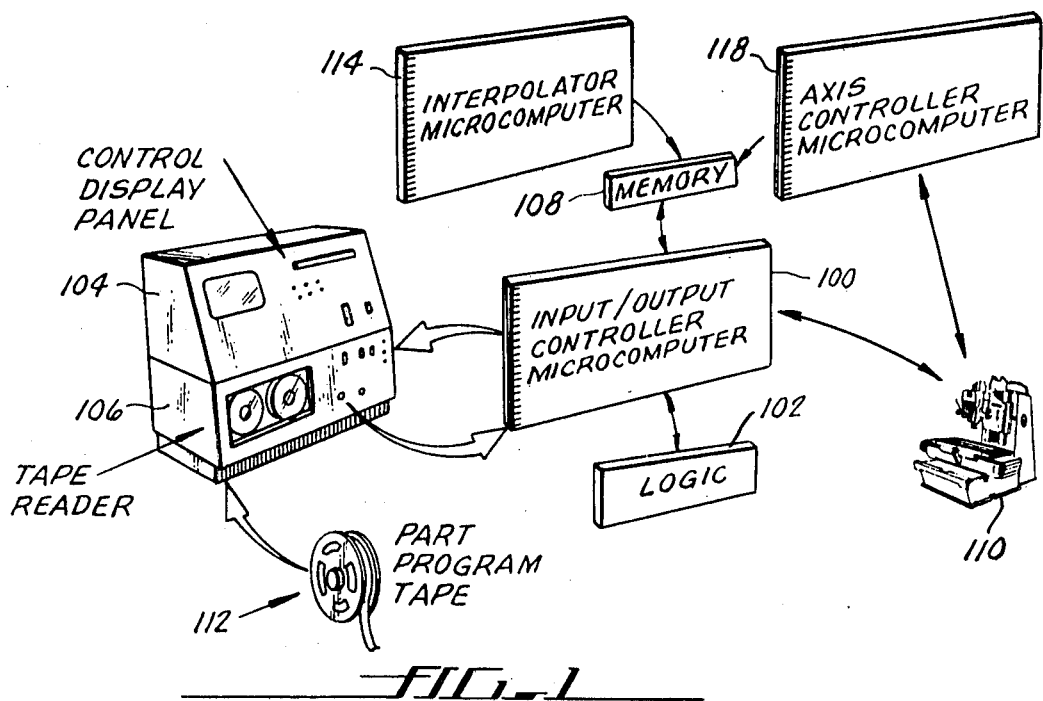
FIG_1
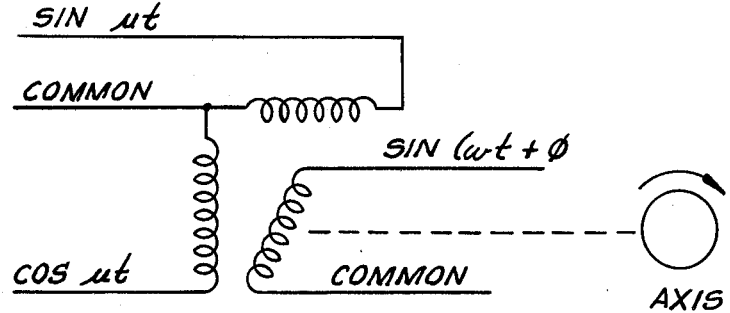
FIG_4

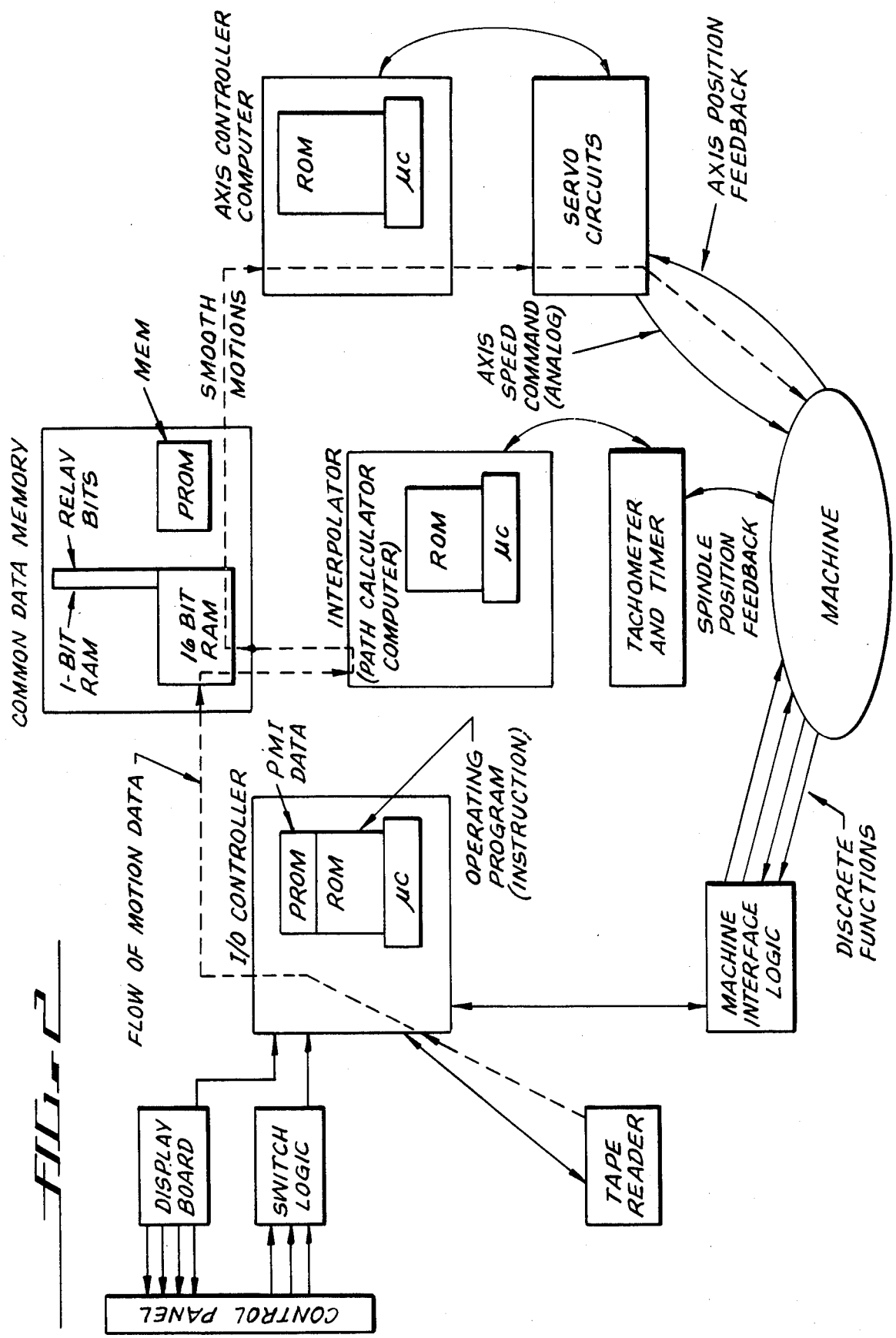

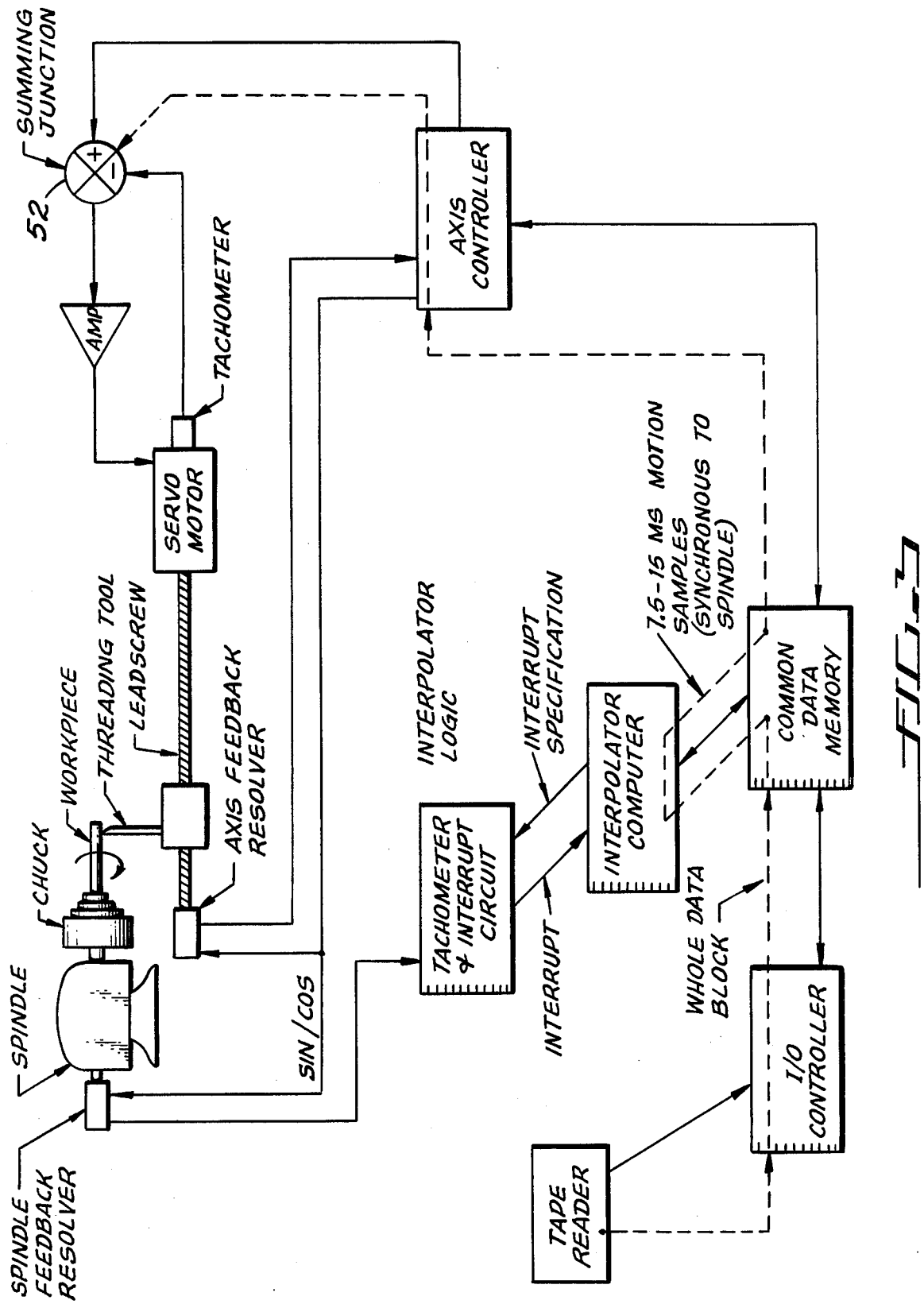

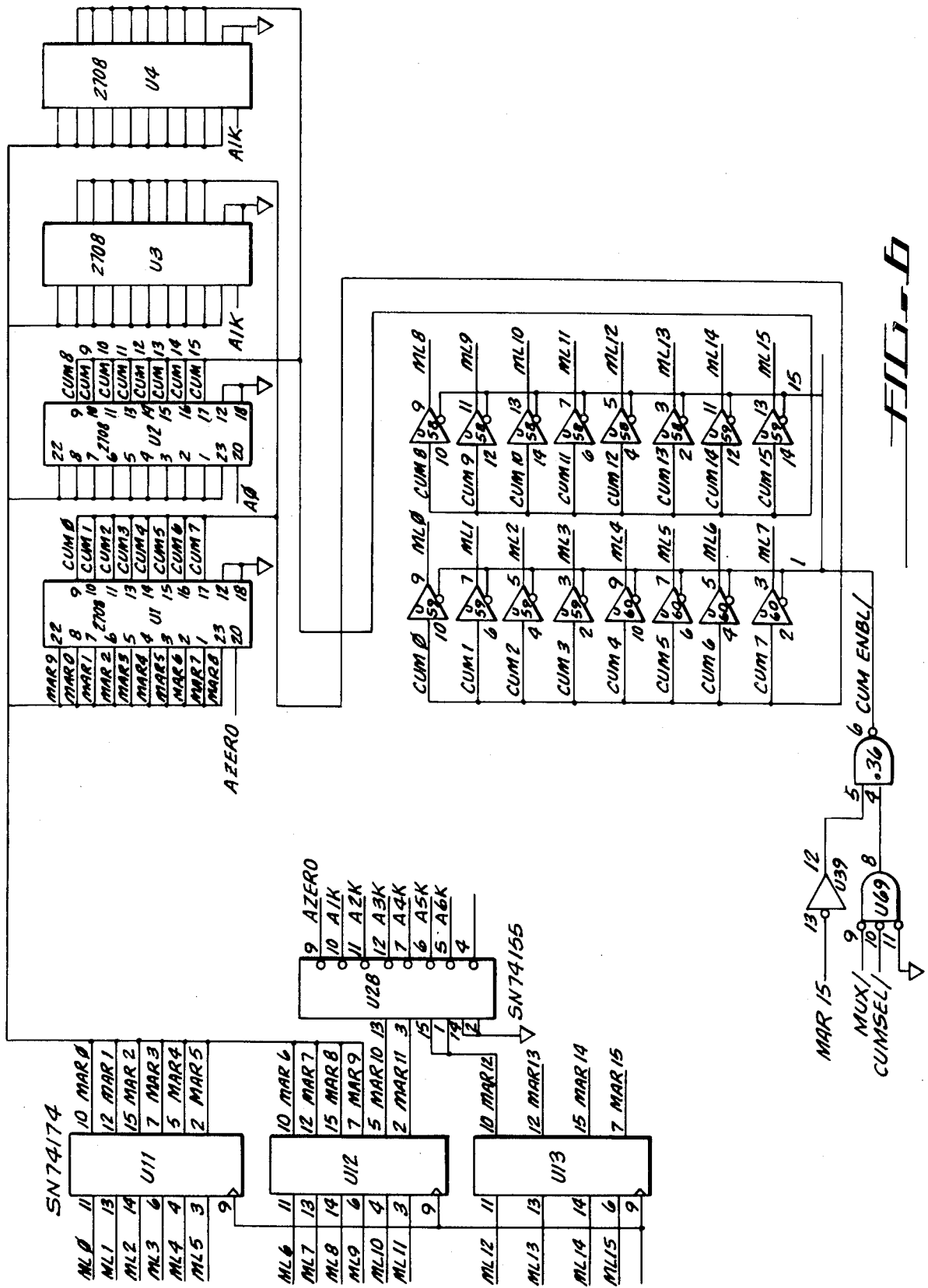

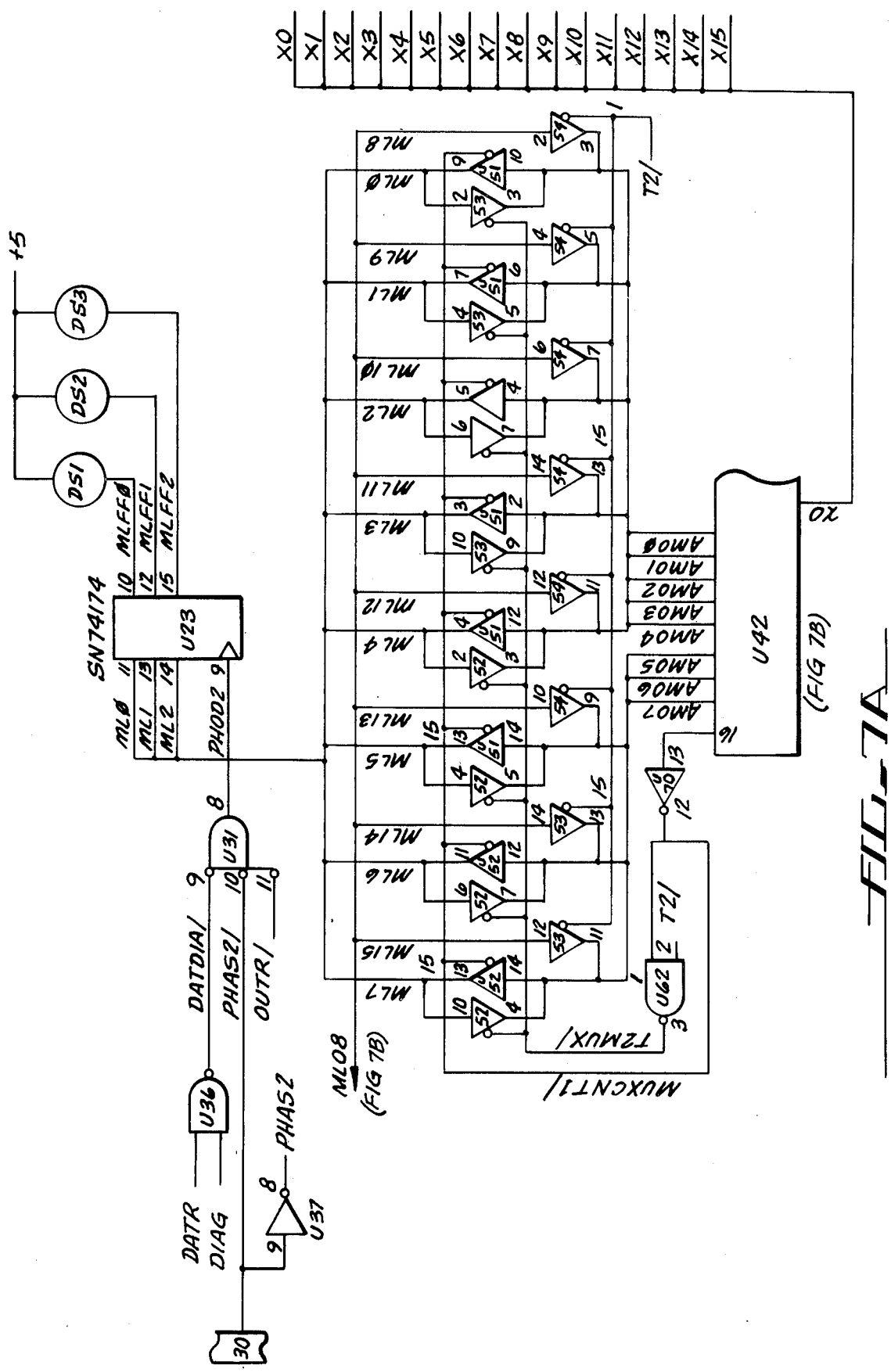

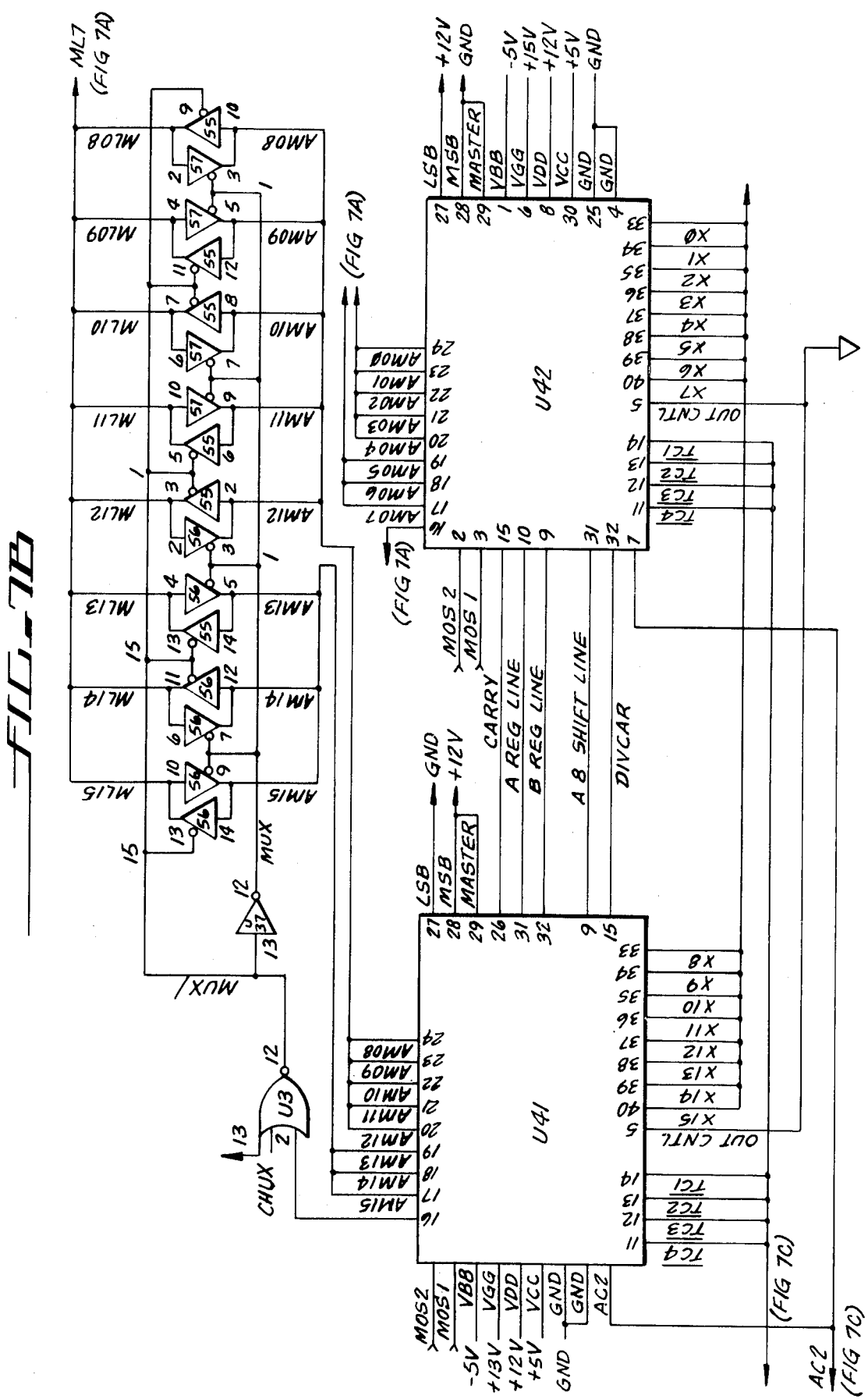

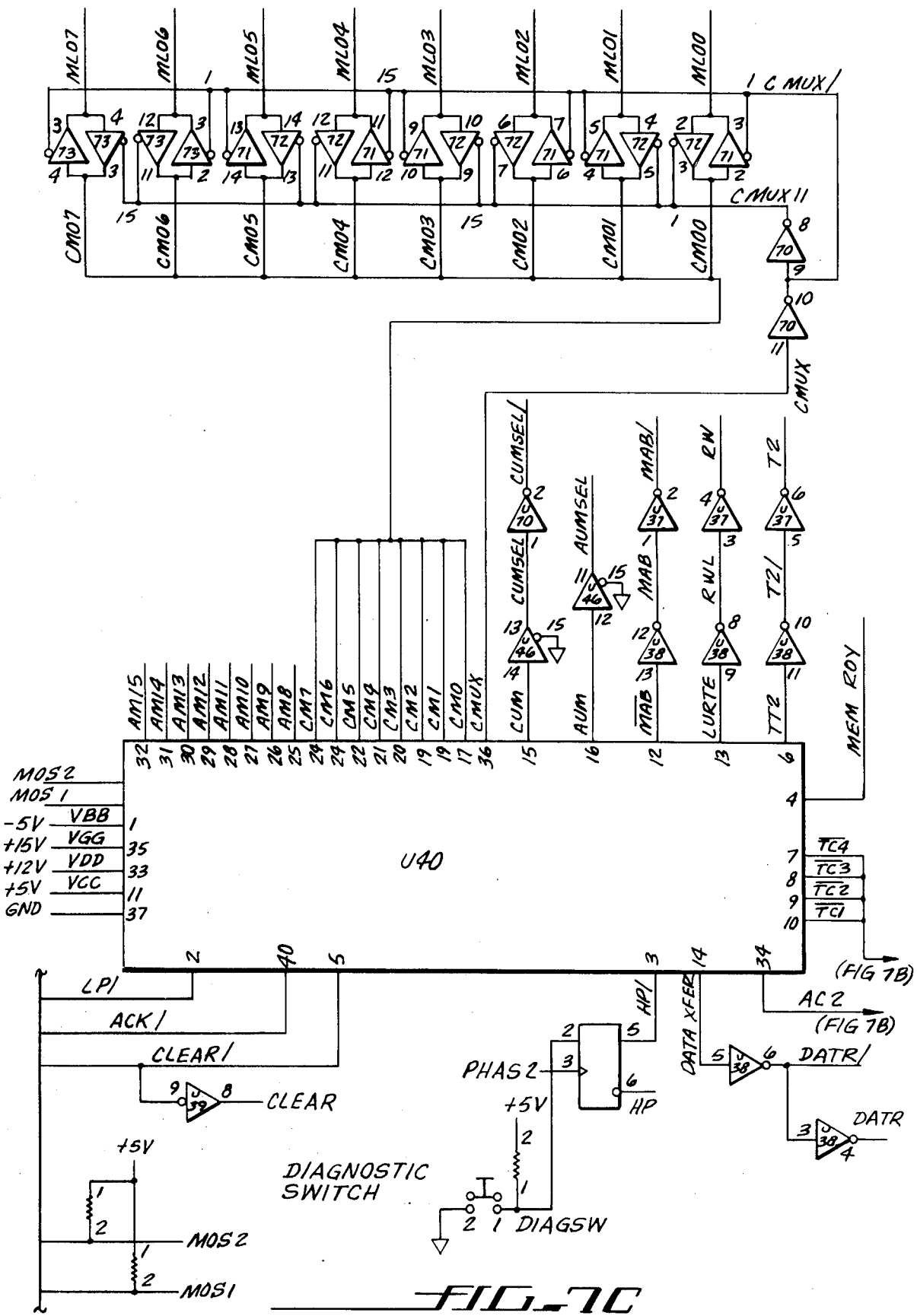

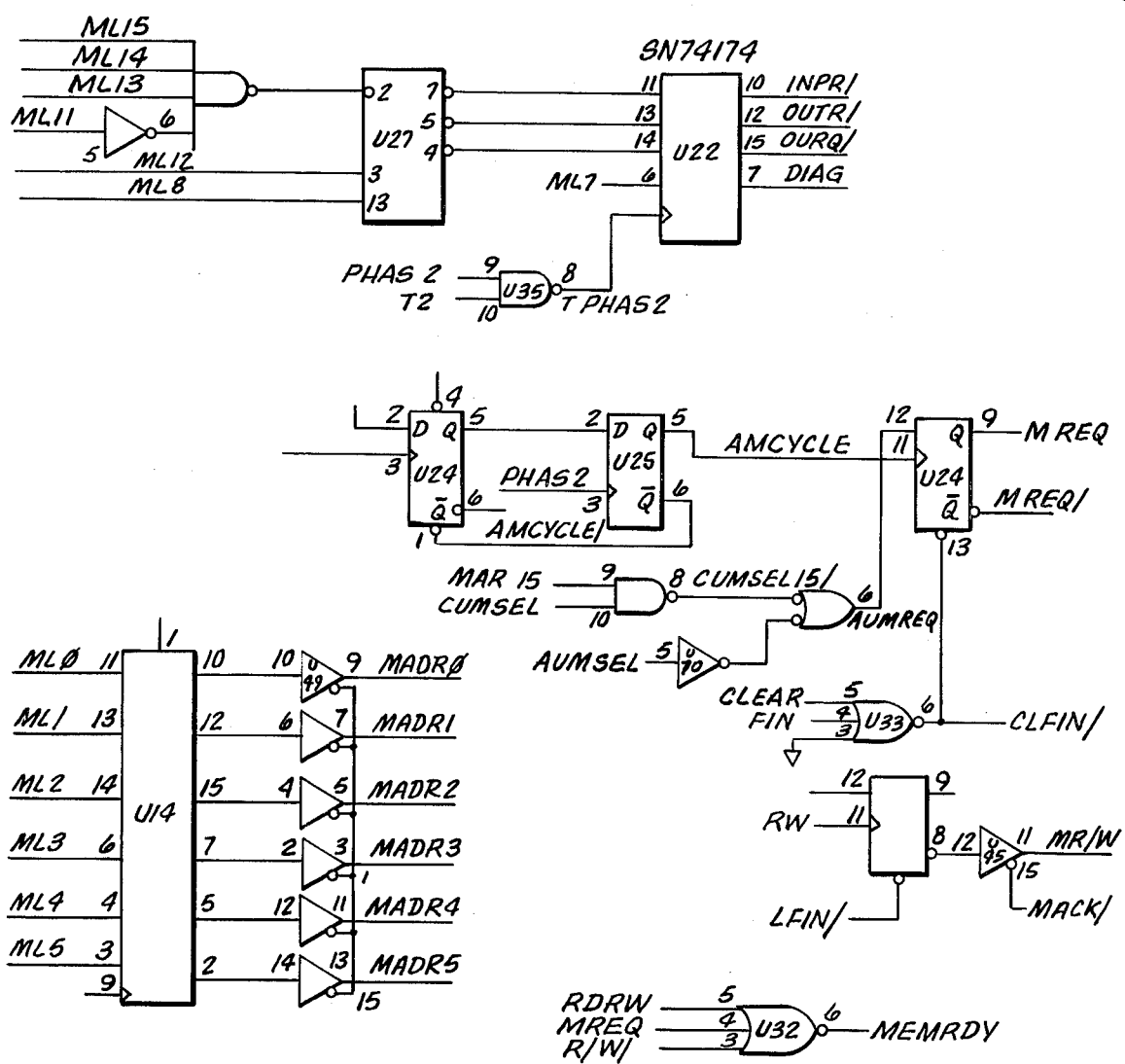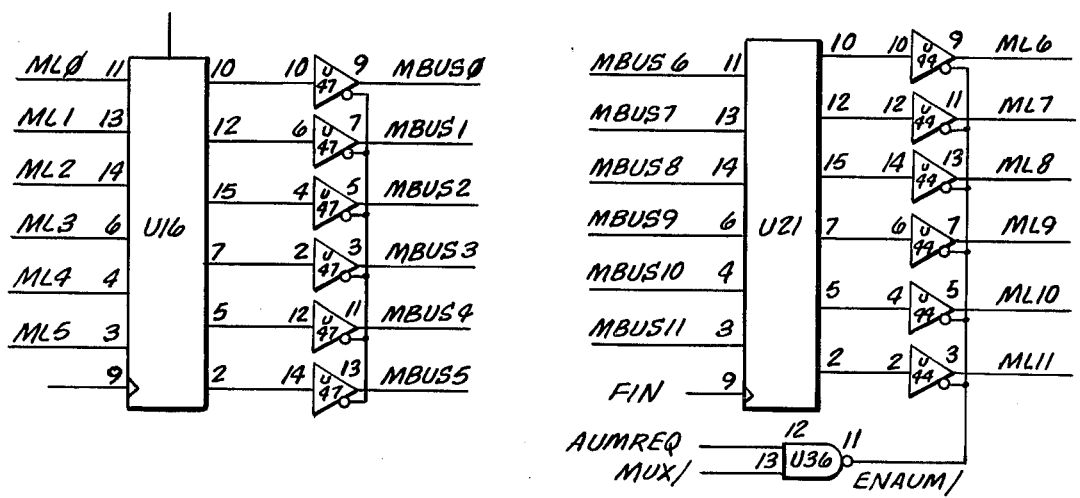
FIG.-8

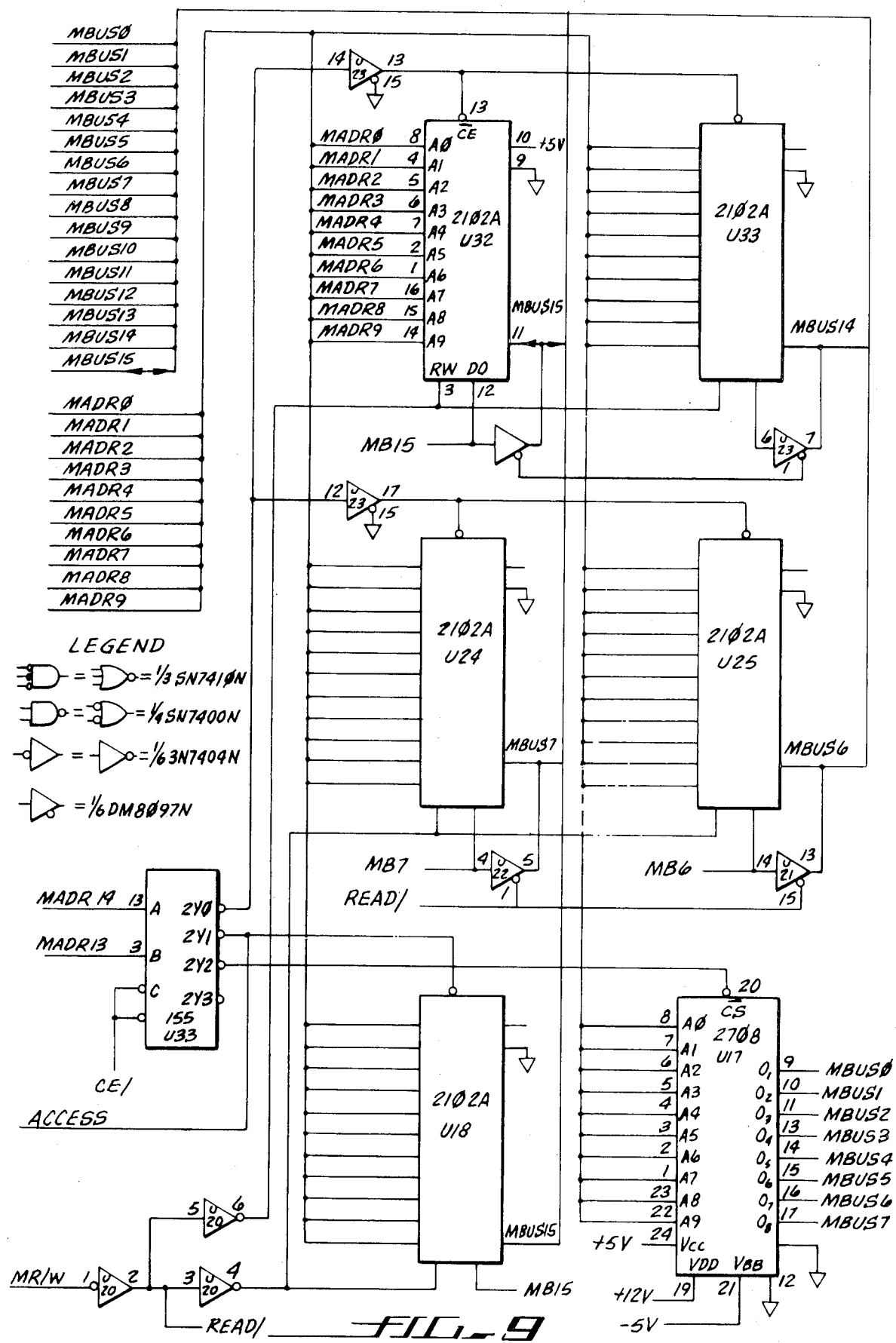
FIG_9

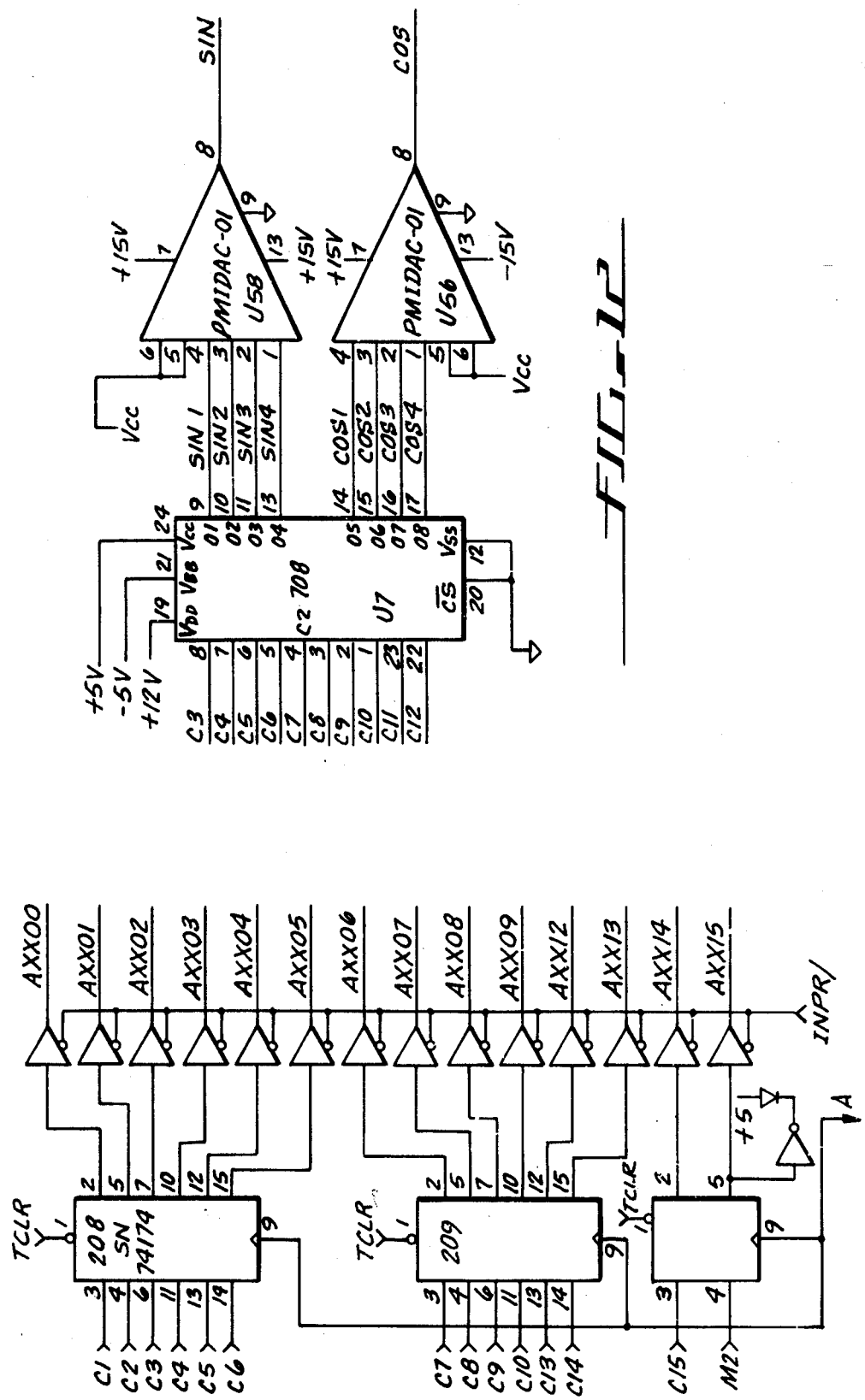

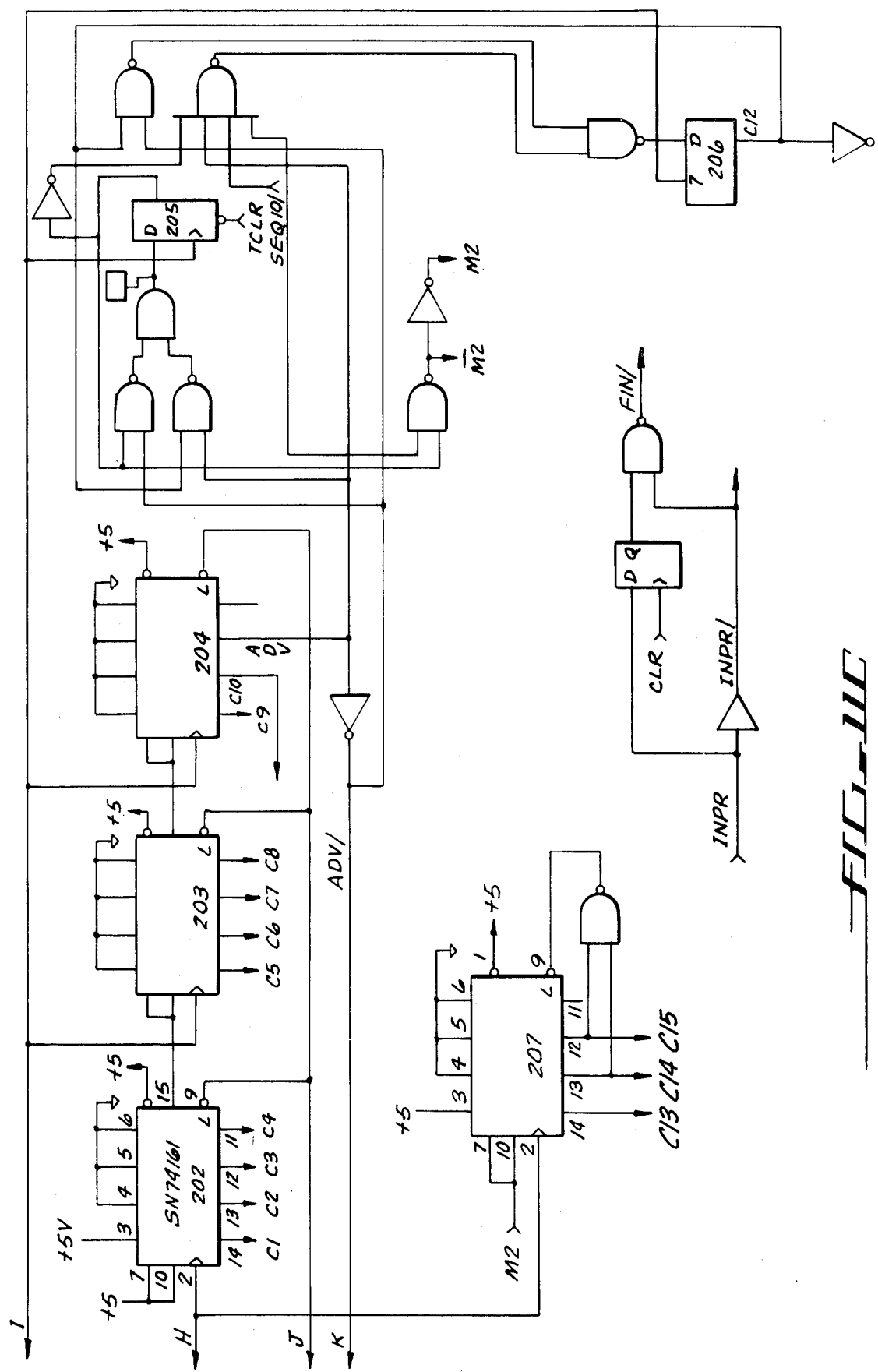

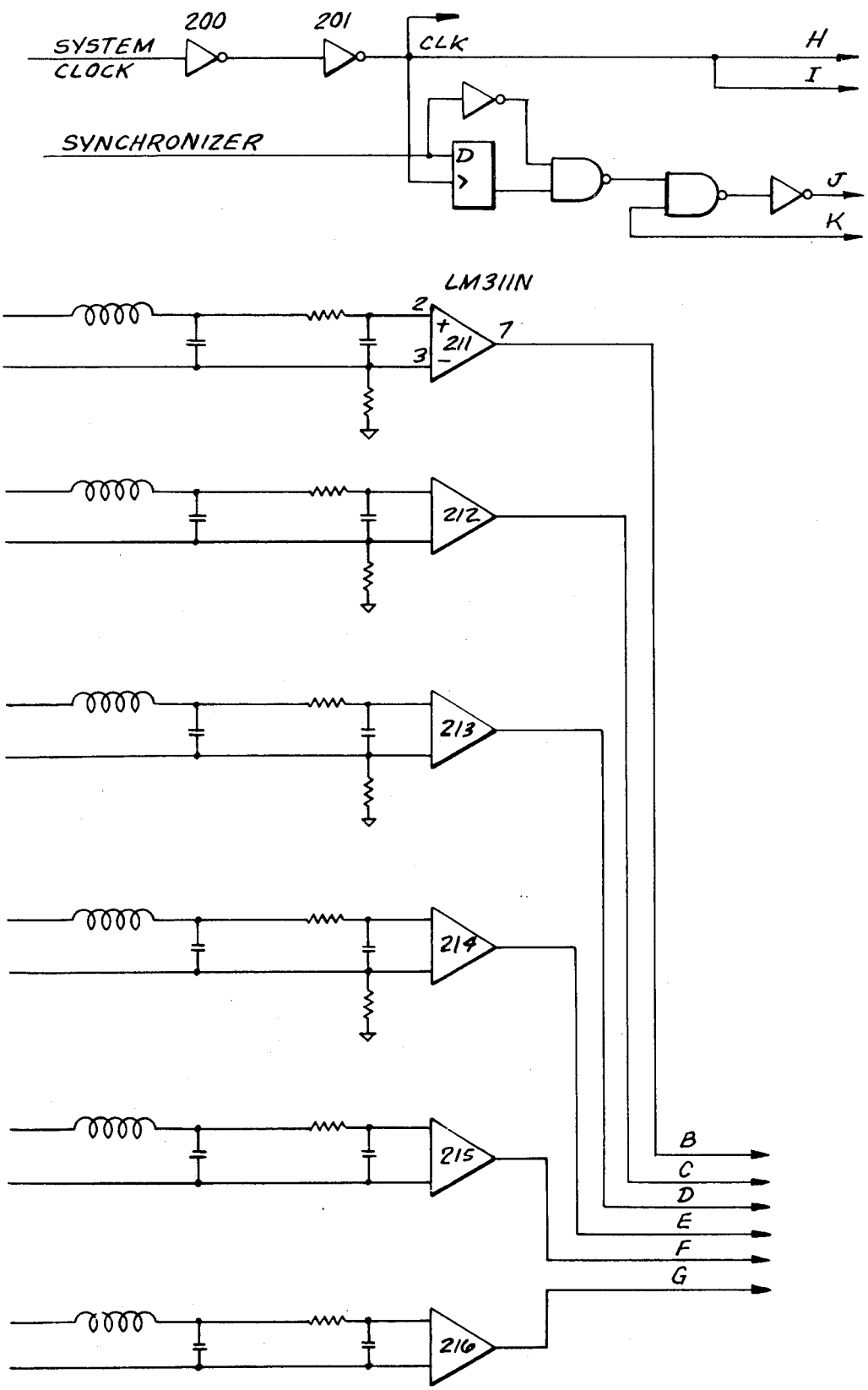

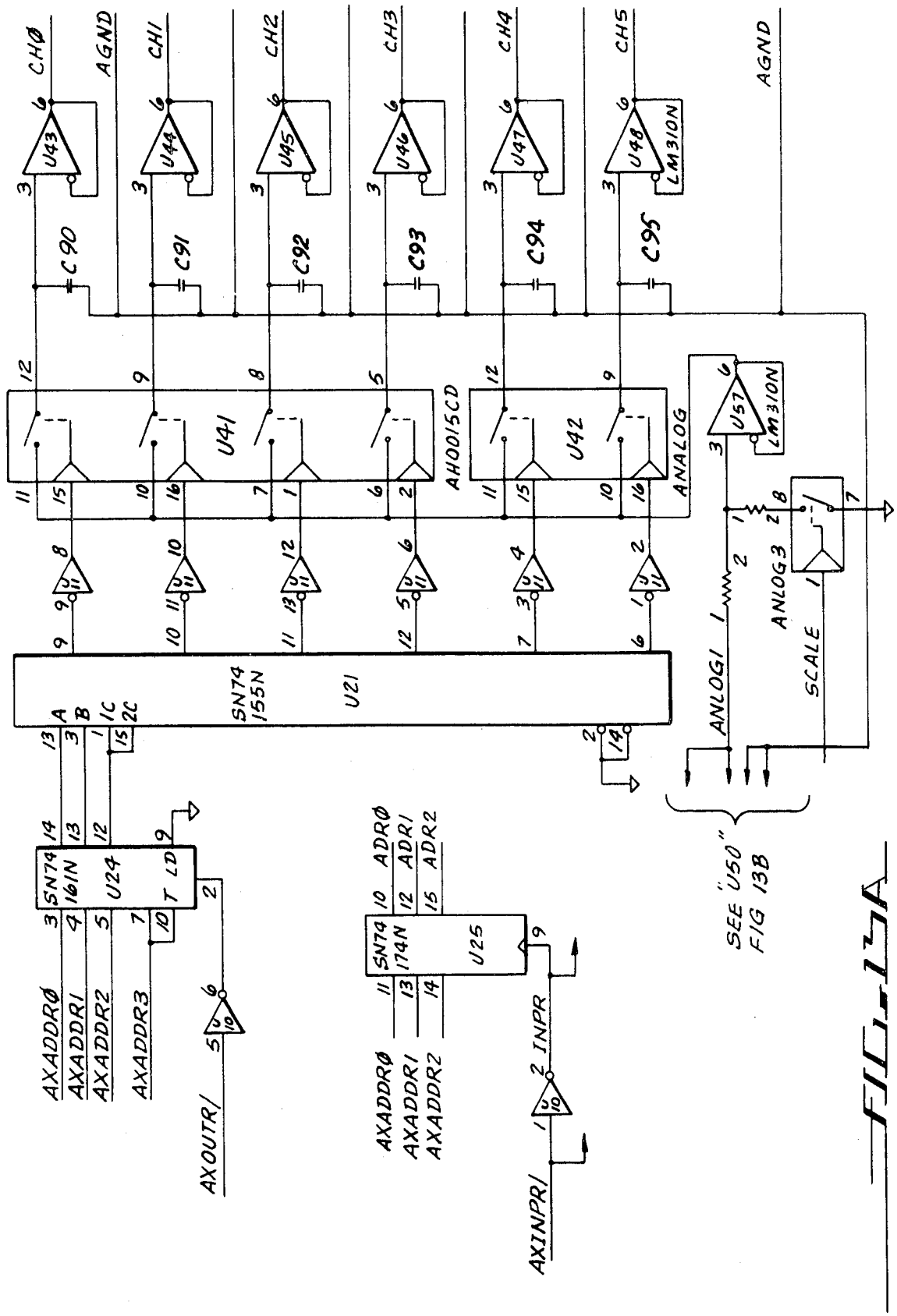

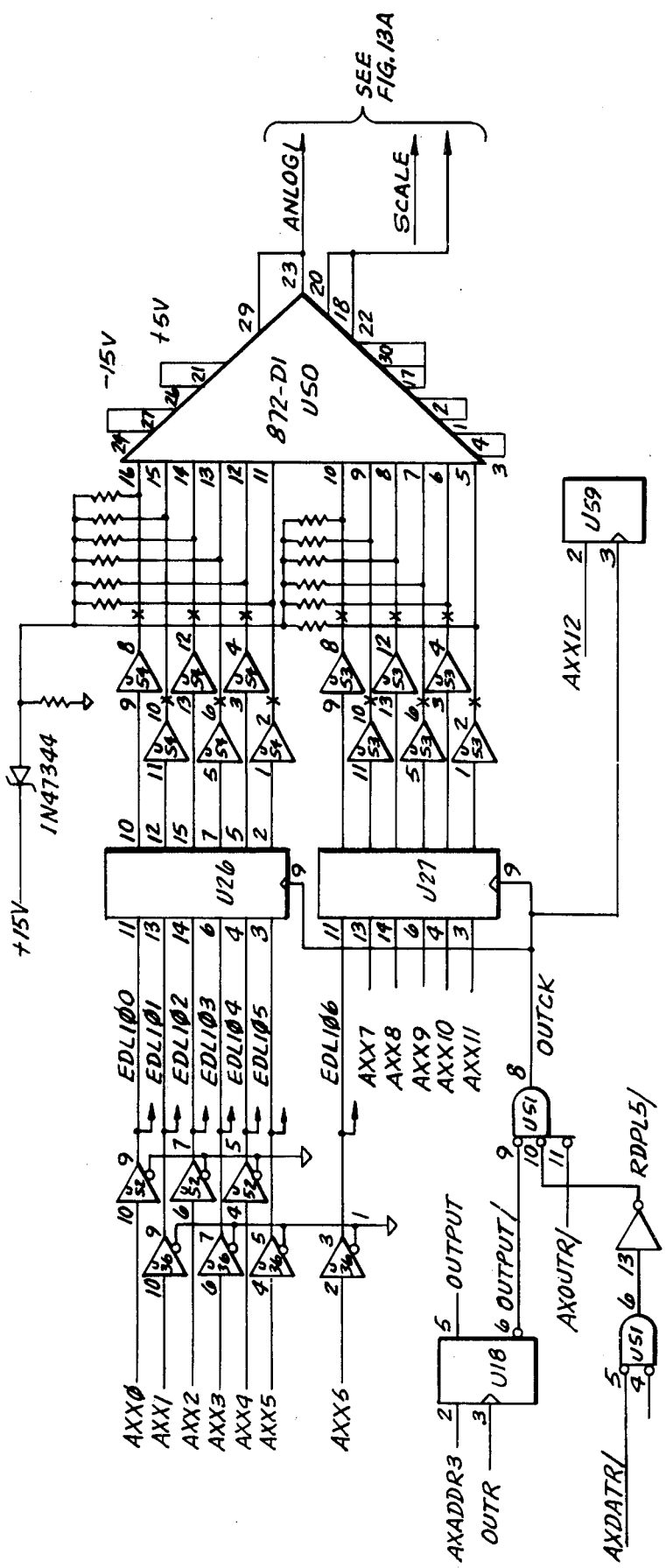

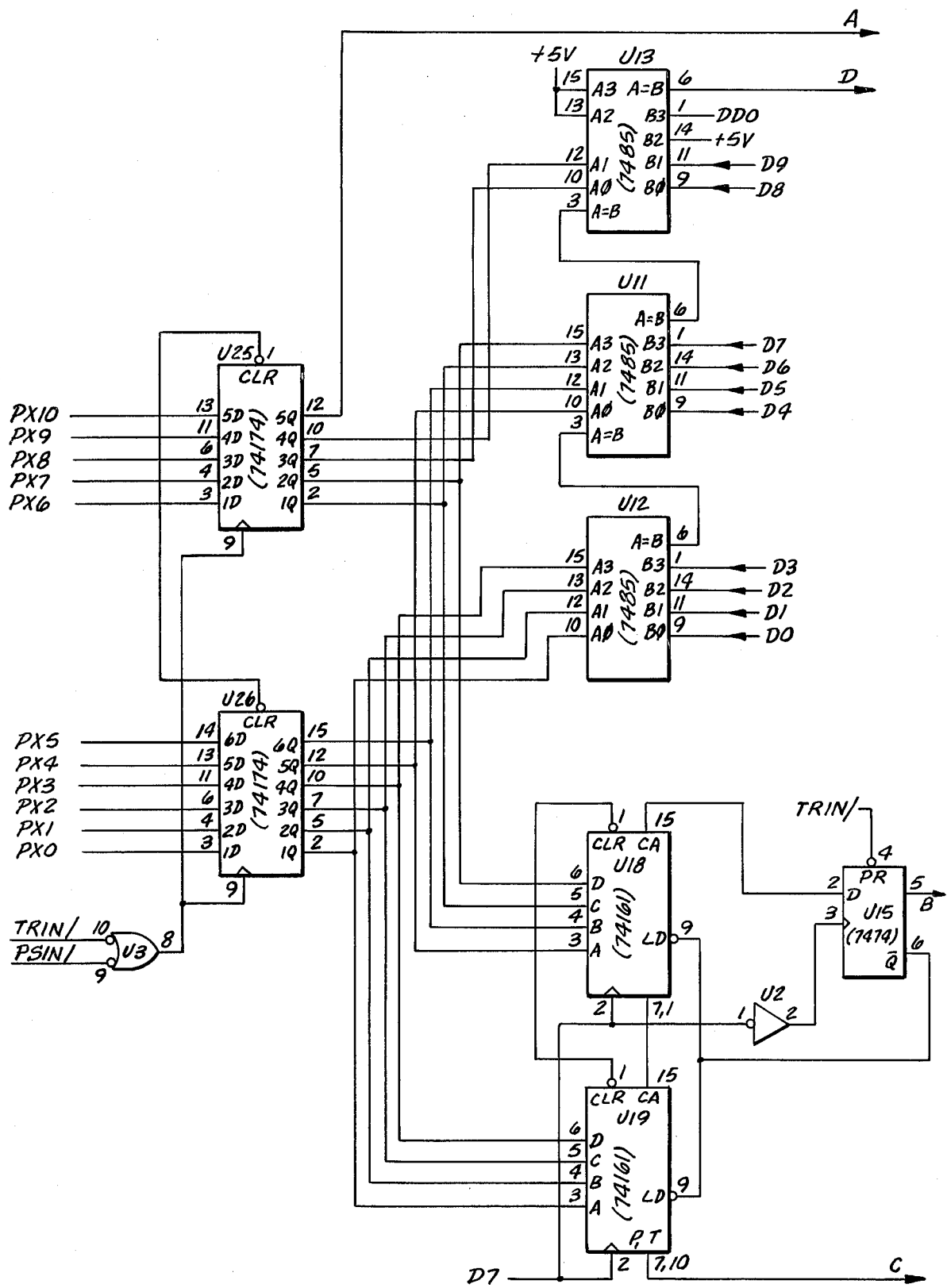
FIG_15A

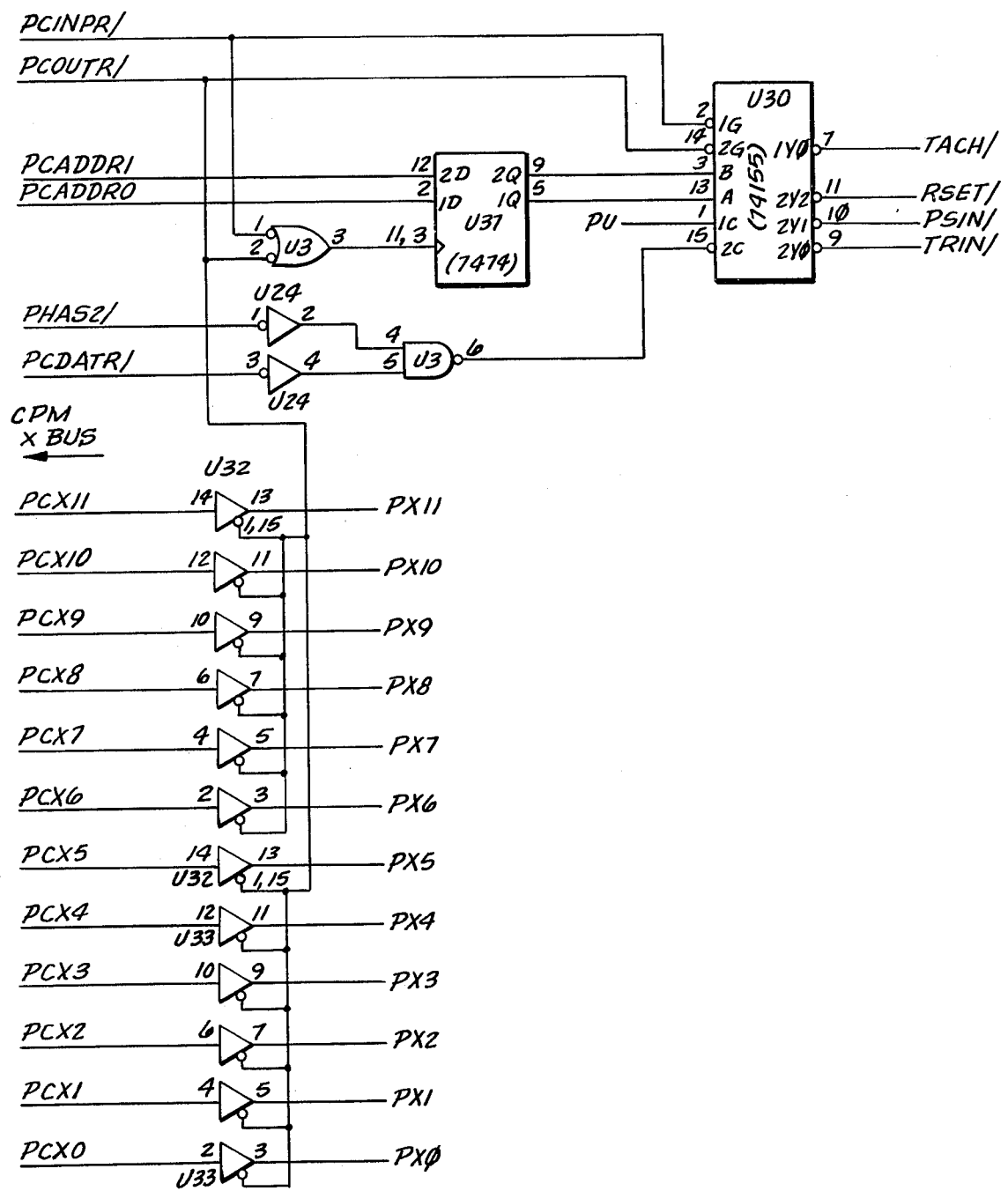
FIG_16

COMPUTER NUMERICALLY CONTROLLED THREADCUTTING MACHINE TOOL

BACKGROUND OF THE INVENTION

This invention relates to a numerical control system for a machine tool and more particularly to an improved apparatus and method for cutting threads in a part on a lathe or similar machine tool.

When using a machine tool such as a turret lathe to cut threads in a piece of cylindrical stock, the cutting tool must proceed at a uniform rate of speed that is synchronized with the spindle speed so that the appropriate number of threads per inch will be cut into the stock. As a numerical example, to machine ten threads per inch, the spindle must make ten revolutions for each inch of cutting tool motion. At a typical spindle speed of 100 to 200 rpm, the time consumed in cutting 10 threads will be approximately 3 to 6 seconds.

A complication arises in that the thread depth is usually such that the thread cannot be cut in one pass of the cutting tool. A thread with a depth of 100 thousandths of an inch, for instance, may be cut in seven passes of the cutting tool. It is therefore necessary that the cutting tool retrace its path exactly, and so, in addition to regulating the spindle speed and rate of travel of the cutting tool it is also necessary to make sure that the tool path falls along the same cutting line on the stock.

One method of synchronizing the angular position of the spindle with the cutting tool motion is to provide a mechanical linkage between the spindle and the drive screw or lead screw on which the cutting tool is mounted so that the position of the spindle will be directly associated with the position of the cutting tool. Thus, the spindle and lead screw will be driven synchronously and the cutting tool will repeatedly fall along the same thread line on the stock being machined. Using this arrangement, the spindle speed can be varied without affecting the accuracy of the system in that when the spindle speed increases, the rate of travel of the cutting tool will also increase proportionately.

Electrical linkages between the spindle and the cutting tool have also been used. In one configuration the spindle generates a specific number of pulses per revolution which are applied as inputs to a stepping motor driving the lead screw so that the advancement of the cutting tool is related to the spindle speed in discrete steps.

Closed loop servo systems are also available for cutting threads. In a typical servo system a commanded position signal is derived from the spindle angular position, is multiplied by a suitable constant to convert it into a position command and is then applied to the closed loop servo driving the lead screw. A resolver monitors the actual angular position of the lead screw and generates a signal proportional thereto. Finally, the commanded position and the actual position are compared in a summing junction and an error signal is generated, closing the loop. A DC tachometer may be attached to the lead screw to generate a signal corresponding to the actual lead screw rotational speed which is compared against the commanded speed resulting in a speed error which is used to close a speed loop within the larger position loop. Through the use of this circuit, the position of the cutting tool is synchronized to the spindle angular position.

In machine tools equipped with a numerical control system, tool repositioning commands are normally read into the system from a paper tape and are used to develop inputs to the spindle drive motor and cutting tool servo loop. Resolvers or encoders are used to monitor the angular position of the spindle and the lead screw, and the resolver outputs are digitized and used as input data to an interpolator which generates a continuous series of motion commands therefrom. These motion commands are then used as inputs to the remainder of the positioning system. The complex circuits required to implement these functions are expensive to design, maintain and calibrate accurately.

SUMMARY OF THE INVENTION

The computer numerical control system described herein includes an interpolator computer to compute smooth tool motions related to the spindle angular position and speed, and an axis controller computer to drive the cutting tool leadscrew servo circuit. A resolver is attached to the spindle to provide the interpolator with spindle data. In this system, the speed command rate is independent of the spindle speed. Using this system the position command rate is one chosen to compromise the quality and accuracy of the threads being cut while the spindle speed may be selected based on the cutting characteristics of the tool and stock. Of course, the quantitative information contained within the speed command must be a function of the spindle angular position and therefore inputs must be received by the interpolator computer based on both spindle speed and spindle position before an appropriate speed command can be transmitted.

In this system, a new position command is issued to the leadscrew servo every 7½ to 15 milliseconds, a rate which is effectively filtered by the mechanical and electrical inertia of the servo system. Thus, the resultant tool speed is a continuous and smooth motion.

The inputs to the interpolator computer are a series of interrupts which are a function of the spindle angular position and information from a tachometer circuit indicating the spindle speed. Using this information the computer will calculate where the spindle will be at a time between 7.5 to 15 milliseconds after the issuance of the last speed command, will calculate a new speed command based on that position and then will wait for the interrupt corresponding to that spindle angular position before outputting the speed command to the axis controller. The spindle shaft resolver output is digitized into one of 1024 possible segments, enough so that there always is at least one segment interrupt occurring within the 7.5 to 15 millisecond time range.

This mode of operation is contrasted to the procedure used when the tool is cutting a smooth surface or is being repositioned, in which case the spindle angular position is disregarded. The computer will request an interrupt after a specific elapsed time after the last position command.

For a thread, the tool usually waits off the part until the spindle has achieved a predetermined reference angular position and then starts, and continues until the entire area to be threaded has been traversed. However, the system might also choose not to wait for a predetermined spindle position but to begin immediately as in the case of contiguous threads, where threads of unequal size or diameter may be continuously cut into a part.

The system has mechanical inertia and electrical delays which not only filter out the discontinuities of the discrete position commands but also result in a lag of the cutting tool behind the commanded position. This lag is in the order of one thousandth of an inch for each inch per minute of cutting tool speed, resulting in a larger lag at higher spindle speeds. However, in this system this lag can either be compensated for or ignored. Usually, the threads will be perfect since the part itself does not have a reference position and the threads may be started or ended on any angular point of the part. To the extent that the entire set of threads may be positioned higher or lower on the machined part because of this lag, this can be compensated for by the part programmer. This servo lag may be of importance at high threading speeds but at low or intermediate speeds it may be ignored. Finally, a large variation of cutting tool speed may result in a variable lag of the cutting tool behind the commanded position. This would be a rare occurrence since the cutting tool speed almost always approximates a constant. In the rare case where very large variations of spindle speed and cutting tool speed are anticipated, a correction factor may be built into the computation function of commanded positions in the computer.

It is therefore an object of this invention to provide apparatus and a method for producing accurately machined threaded parts wherein the rate of position commands to the cutting tool leadscrew is independent of the spindle speed. This invention contemplates the use of one computer to be used as an interpolator to produce speed commands related to spindle position and speed, and a second computer to control the servo circuit. Spindle speed and position data are produced from the output of a resolver attached to the spindle.

BRIEF DESCRIPTION OF THE DRAWINGS

FIG. 1 is a pictorial diagram of the system.

FIG. 2 is a simplified block diagram of the entire system.

FIG. 3 is a functional diagram of the system configured for thread cutting.

FIG. 4 is a more detailed schematic of the resolver.

FIGS. 6, 7A, 7B, 7C and 8 are a schematic of the computer used in this embodiment.

FIGS. 9, 10A and 10B are a schematic of the common data memory.

FIGS. 11A, 11B, 11C, 11D, 12, 13A and 13B are a schematic of the axis controller circuits.

FIGS. 14A, 14B, 15A, 15B and 16 are schematics of the tachometer and interrupt circuits.

DETAILED DESCRIPTION OF THE INVENTION

Figure 5:
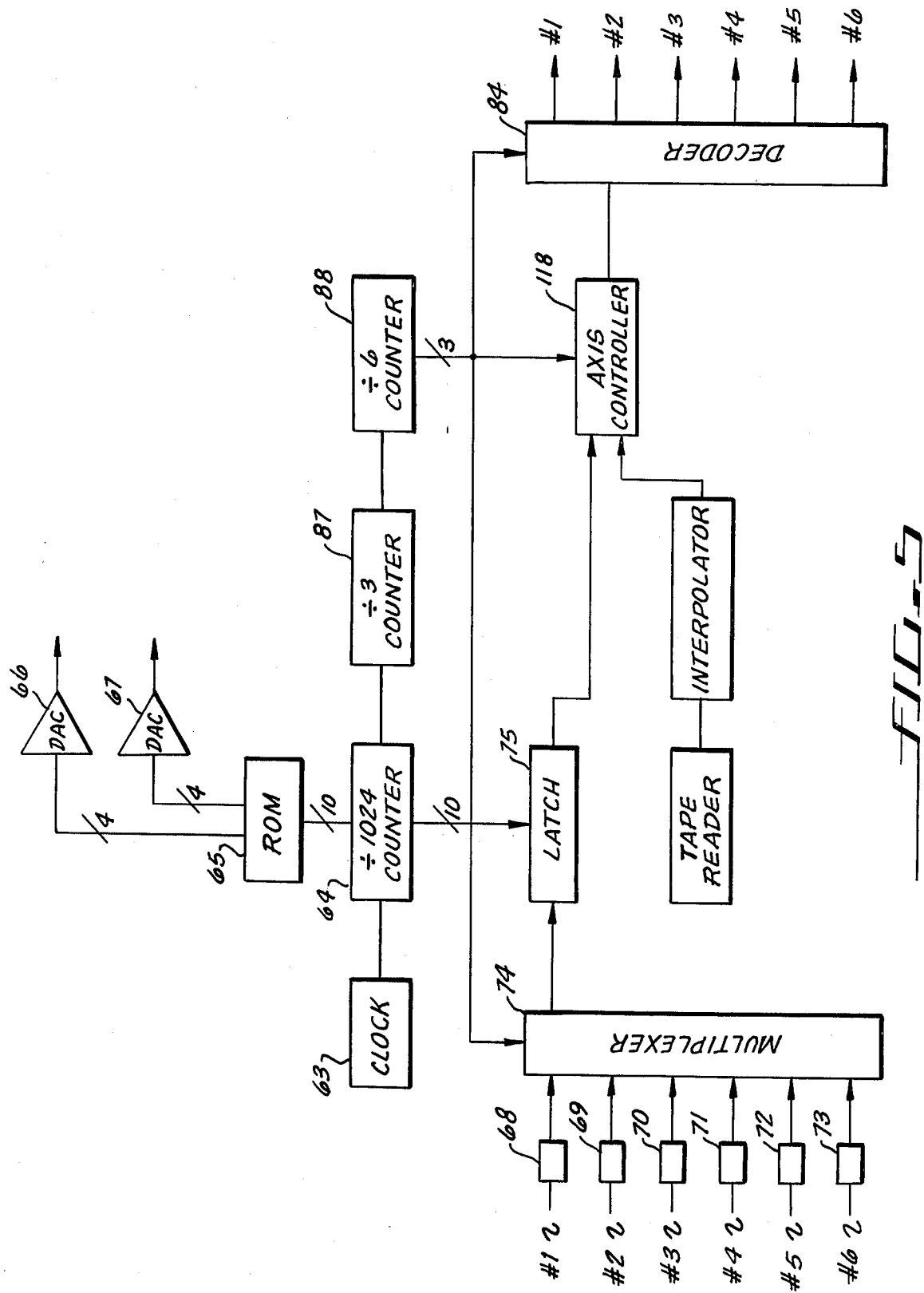
FIG. 5 is a simplified block diagram of the axis controller computer and associated circuits.

FIG. 1 is a pictorial diagram of this computer numerical control system showing its main components. Computer 100, the input/output controller, controls the flow of information between the control display panel 104, the tape reader 106, the common data memory 108 and the machine tool 110. Numerical data for the machining of particular parts are read in from a tape 112, paper or magnetic, through the tape reader 106, or may be supplied from the input/output controller computer memory after having been previously loaded from tape. This information is received by the input/output controller 100 and loaded into common data memory 108. Likewise, particular bits of information are received from the control display panel representing the status of various switches set by the operator and various bits of information set by the machine tool such as overtravel limit switches and interlocks. Output from the input/output controller 100 is fed out to the control display panel to drive certain indicators and display lights and other data is output to the machine tool to control functions such as spindle speed and coolant flow.

Computer 114 is an interpolator. It receives basic part shaping data from the paper tape reader 106 through the input/output controller 100 and from these simple commands representing curves of various kinds, generates detailed machine instructions in real time. As described above, the cutting of a thread comprises a large number of discrete machine tool movements. The particular piece by piece movements are calculated in the interpolator 114 and output to the axis controller 118 for eventual control of the machine tool 110. Axis controller 118 controls six servo loops corresponding to six controllable axes of the machine tool, which includes the cutting tool lead screw.

The angular position of the lead screw is monitored by a resolver. In this system the inputs to each resolver are sine and cosine waves and the output from each resolver is a sine wave displaced through a certain phase angle determined by the axis position. The sine and cosine waves are generated digitally and are converted into an analog sine wave in a digital to analog converter before being applied to the resolver. The resolver output also is converted into digital form before being used. All the remaining functions of the servo loop are digital, the entire process being controlled by the axis controller 118.

FIG. 2 is a more detailed functional block diagram of the system showing the three microcomputers.

In this diagram the flow of motion data, that is, the data used to control the motion of the part or tool in up to six axes of rotation generally follows the path represented as a dotted line. The digital codes representing the tool or part motion for each axis are read from the tape reader through the input/output controller to be loaded temporarily into the common data memory. These codes are similar or identical to codes that are normally received from the tape reader in prior art systems and define the beginning and end point of a part or tool and the path that the part or tool should take in going from the starting point to the end point. Tape reader data is stored in the 16 bit random access memory section of the common data memory.

The interpolator, which is the computer used to calculate the instantaneous tool and part positions, will access this motion data from common data memory and will compute the step by step smooth motions in real time that will lead the tool or part through from the beginning point to the end point along the path designated by the input device. These smooth motion data packets are then loaded back into common data memory where they are available to the axis controller computer for providing positioning information to six sets of servo circuits, each controlling an axis. The servo circuits provide an analog axis speed command to the motor driving each machine axis.

A second main channel of information transfer is used to control the digital functions of the machine tool. These functions are the turning on of coolant flow, the providing of power through interlock systems, the indexing of tools and the turning on and subsequent speed selection of the spindle motor, for example. Data for controlling these discrete functions is read in from an input device through input/output controller and is fed directly through the machine interface logic to control the machine. The machine may likewise receive instructional data from the operator through the activation of various switches and push buttons on the control panel. The flow of this data is from the control panel through the switch logic, through the I/O logic controller and through the machine interface logic to the machine. Finally, data available at the I/O controller, either from the tape reader or from the machine, may be transmitted through the display board to the control panel for display to the operator.

The apparatus for controlling the on/off functions of the machine through information read from the tape reader or received from the control panel may be broadly referred to as the programmable machine interface since this apparatus serves the function of the various relays and circuits required in a prior art system to control the machine functions as a result of information received from the tape reader. Since this machine interface is implemented, not from hardware but from a programmable computer, the reconfiguration of the system is accomplished by the programmable machine interface. Specifically, the symbolic relay diagram required to tailor the numerical control system to the particular machine tool and to the particular use to which the machine tool will be put is referred to as programmable machine interface (PMI) data and is loaded into one part of the memory of the I/O controller which is implemented from programmable read only memory (PROM) devices. The remainder of the memory, comprising read only memory (ROM) devices is used to store the operating programs or instructions for the computer. Thus, the contents of the PROM and ROM memory provide operating instructions and data for the microcomputer. Given this configuration the input/output controller accomplishes the on/off functions of the machine including input device control data input, data display, discrete inputs and outputs to and from the machine tool, implements the programmable machine interface and drives the analog to digital converter. These functions will be discussed in more detail below.

The PMI data is in the form of symbolic relays to control all the functions of the machine tool, the relay implementations actually being one bit for each symbolic relay contact. The relay section of the common data memory therefore comprises a one bit array of random axis memory, where each bit will either be on or off to symbolically represent whether the contact of each relay is closed or open. Using this system, the PMI data in the PROM of the I/O controller, therefore, is simply a collection of addresses of bits in the common data memory. Since the "relays" are contained within the common data memory and I/O controller memory, it is programmable since any combination of relay functions may be implemented simply by reprogramming the input/output controller.

The common data memory also contains a 16 bit RAM for temporary storage of data received from the input device and a programmable read only memory for storing permanent data. The interpolator comprises a microcomputer and programs stored in a read only memory. The interpolator receives data from the input device through the common data memory and generates smooth motions in real time which are reloaded into common data memory for reference by the axis controller. One input to the interpolator is spindle speed and position information which is received through a circuit board containing tachometer and timer circuits.

The axis controller is also a microcomputer comprising a read only memory. The function of this computer is to drive six servo circuits, one of which drives the leadscrew. The axis controller receives information through the servo circuits indicating the actual position of the axis to be controlled, receives motion commands from the interpolator through the common data memory as to the desired position and outputs to the servo circuits a speed command proportional to the difference. The servo circuits produce the appropriate outputs to drive each of the six servo axes, and an error indication is received back from each axis resolver to close the servo loop.

FIG. 2, then, is an overall functional diagram of the system. Each particular part of the system will be discussed in more detail.

FIG. 3 is a simplified block diagram of the major components used in the thread cutting process. The spindle is driven at a relatively constant rate by a spindle drive motor. A typical spindle speed may be 100 or 200 rpm's but there is a normal variation of a few percent above or below the normal speed. The work piece is attached to the spindle by means of a chuck and a spindle feedback resolver is mechanically attached to the spindle so that the resolver rotates one time for each rotation of the spindle. As the spindle and work piece turn, the threading tool moves to cut a thread in the workpiece. The threading tool is driven by rotation of the leadscrew which in turn is driven by a servo motor. The servo motor is part of a typical servo circuit in which a summing junction receives a speed command and applies it through an amplifier to the servo motor. The servo motor angular velocity is monitored by a tachometer which feeds back a signal to the summing junction. The output of the summing junction therefore is a speed error signal.

The data controlling the thread cutting process is originally read from the input device under control of the input/output controller and is first stored temporarily in the common data memory.

In order to produce discrete speed command in real time the interpolator must have access to not only the data block received from the tape reader but also information concerning the angular speed and position of the spindle. The data block information is accessed from the common data memory while the spindle information is produced by a tachometer and interrupt circuit which produces this information from the output of the spindle feedback resolver. From the data block information and from information received from the tachometer circuit indicating the spindle speed, the interpolator computes the next motion sample and the time at which the motion sample should be transmitted. The interrupt circuit is set so that when the spindle arrives at the precomputed angular position an interrupt will be issued to the interpolator at which time the next motion sample will be loaded into common data memory.

The axis controller, which is constantly polling the common data memory storage locations, will access this motion sample data, translate it into a speed command and transmit it to the summing junction at which point the servo motor will servo at the commanded speed. The angular position of the leadscrew is monitored by an axis feedback resolver which is connected to the leadscrew so that one rotation of the leadscrew results in a plurality of rotations of the axis feedback resolver. The output of this resolver is trasmitted to the axis controller, closing the position loop. A digitally driven digital-to-analog converter in the axis controller produces the sine and cosine reference signals for both spindle feedback resolver and axis feedback resolver for convenience.

The resolver of FIG. 3 is shown in more detail in FIG. 4 and comprises two stator windings spatially oriented 90° apart and driven by two three kilohertz sine waves 90° out of phase, $\sin \omega t$ and $\cos \omega t$. The rotor winding is mechanically coupled to the axis and produces a sine wave output $\sin (\omega t + \phi)$ which is in phase with the rotation of the axis. This phased output is used as an input to the position summing junction 52 of FIG. 3.

In the preferred embodiment of this invention the sine wave inputs to the resolver are produced by a digital to analog converter and the sine wave output from each resolver is converted into a digital pulse whose timing is proportional to the phase of the sine wave output of the resolver. This is shown in FIG. 5 as a simplified block diagram where a digital clock 63 produces a binary output of approximately three megahertz which is counted down by a mod 1024 counter 64 which cycles at the rate of 3,125 full counting cycles per second. The ten output lines are applied to a read only memory device 65 as address lines producing two sets of four binary outputs which are used as inputs to two digital to analog converters 66, 67. The read only memory device is programmed so that as the counter steps through a complete 1,024 step cycle the outputs from the ROM produce a digital signal which when converted into a voltage level by the digital to analog converters will produce at the outputs of these two converters signals closely resembling two sine waves 90° out of phase. Of course, upon close inspection, these outputs will appear to be step functions rather than pure sine waves but subsequent filtering produces a voltage wave shape functionally equivalent to a pure sine wave. These outputs are used to drive the resolvers.

The $\sin (\omega t + \phi)$ resolver outputs are received by zero crossing detectors 68 through 73, the output of which are binary signals whose outputs switch at the time when the input sine wave signals pass through the zero crossing points. These signals and the output from the mod 1024 counter are continuously applied to latches 74 through 80 where the zero crossing signals will be used as clocking pulses to load the mod 1024 counter data into the latches as the sine waves go through zero. In this manner the phase variation of the sine wave inputs to the zero crossing detectors are converted into discrete binary counts. Additionally, since the same mod 1024 counter is driving the digital to analog converters which produce the $\sin \omega t$ and $\cos \omega t$ signals, it is seen that the phase variation between the input and output of the resolvers have been translated into a binary count form at the latches. This phase information in binary form is now available to a digital summing junction, which in this embodiment is an arithmetic logic unit (ALU) of a computer 118, and is used as the actual position input.

The axis controller 118 of FIG. 1 receives six sets of position data from the interpolator 114 through the common data memory 108, compares them with the actual positions and outputs position errors through decoder 84 of FIG. 5 to the axis drive systems. The timing for coordinating the multiplexing and decoding of six sets of signals is generated by outputting the mod 1024 counter 64 overflow bit into a mod 3 counter 87 and mod 6 counter 88. At the rate of 176 times per second, the four outputs from the counters 87, 88 will be used to select one input to the multiplexer 74 and the corresponding output at decoder 84.

FIGS. 6, 7A, 7B, 7C, and 8 comprise a schematic of the three computers used in the preferred embodiment, all of which are identical. In FIG. 6, devices U1 through U4 are eight bit by 1K programmable read only memory (PROM) devices. The computer may contain up to 14 of these devices but only four are shown since the remaining circuits are identical. These devices contain all the programs required by the computer in this numerical control system. The devices receive their addressing information on lines MAR0 through MAR9 and the eight bit data words are output on lines CUM0 through CUM7. Since the computer is organized around a 16 bit word length these PROM's are always used in pairs with the second PROM of each pair supplying the other eight bits of the data word, CUM8 through CUM15. The devices are selected through select lines AZERO, A1K, etc. Addressing information is initially received on lines ML0 through ML15 and is temporarily stored in registers U11, U12, and U13 during the PROM read and write cycles before being output onto the MAR0 through MAR9 address lines. Decoder U28 decodes the high order address bits into device select bits AZERO through A6K. The address bits on lines ML0 through ML15 are received from the circuits shown on FIGS. 7A, 7B and 7C. The 16 bit output data words are buffered through devices U58, U59 and U60 of FIG. 6 and are output on lines ML0 through ML15 which is a bi-directional data bus between this control memory and the schematic shown in FIGS. 7A, 7B and 7C.

The bi-directional MS address and data bus is shown on FIGS. 7A, 7B and 7C as lines ML00 through ML15. Tristate devices U51 through U73 are used to direct either address data out to the control memory or to direct data or instructions back from the control memory.

This data and instruction information is received by the computer which is a three chip set U40 of FIG. 7C and U41 and U42 of FIG. 7B on lines AM00 through AM15 and CM0 through CM7. Device U40 is an instruction decoder and devices U41 and U42 are each eight bit arithmetic logic units (ALU). The entire three chip set therefore comprises a 16 bit microcomputer. In a typical operation, instruction information is received from the control memory at the decoder U40 instruction decoder at lines CM0 through CM7 where they will be interpreted. The appropriate control lines from decoder U40, $\overline{TC1}$ through $\overline{TC4}$, direct ALU U41 and U42 to operate on the data being received at data lines AM00 through AM15 or instruct arithmetic logic units U41 and U42 to output certain data on lines AM00 through AM15.

A second set of 16 l data input/output lines are provided to the arithmetic logic units U41 and U42 through lines X0 through X15. As will be described in more detail below, these are the lines on which the velocity error signal is output from the computer to the digital to analog converters that generate the sine and cosine inputs to the resolvers. This three chip set comprising microcomputer elements U40, U41 and U42 are typical instruction decoder and arithmetic logic units, similar to Motorola Part No. 6800. At the bottom of FIG. 7C is a diagnostic switch which, when depressed, generates a discrete signal activating the execution of a diagnostic subroutine contained within the control memory. The results of this diagnostic routine are transmitted to device U23 of FIG. 7A through data lines ML0 through ML2 and result in a coded pattern of lights displayed by lamps DS1 through DS3. The remainder of the logic in FIGS. 7A, 7B and 7C generates miscellaneous logical functions.

FIG. 8 is a schematic of the remainder of the data bus structure. Because of the redundant nature of the circuits, only six of each set of 16 address lines are shown. The common data memory board receives its addressing information on MADR0 through MADR15 through register U14 from the ML line of the microcomputer data bus. In a similar fashion the common data memory board data bus is driven by lines MBUS0 through MBUS15 through register U16 from the same ML lines. Finally, data from the common data memory is received through lines MBS0 through MBS15 and is transmitted through register 21 to the ML lines of the computer. Some memory cycle logic is also shown in this diagram. The logic provides that when a computer requests a memory cycle, the computer is put into a hold state until that memory cycle has been granted. At the conclusion of the memory cycle the data will either have been read out of or read into the common data memory.

Figure 10A:
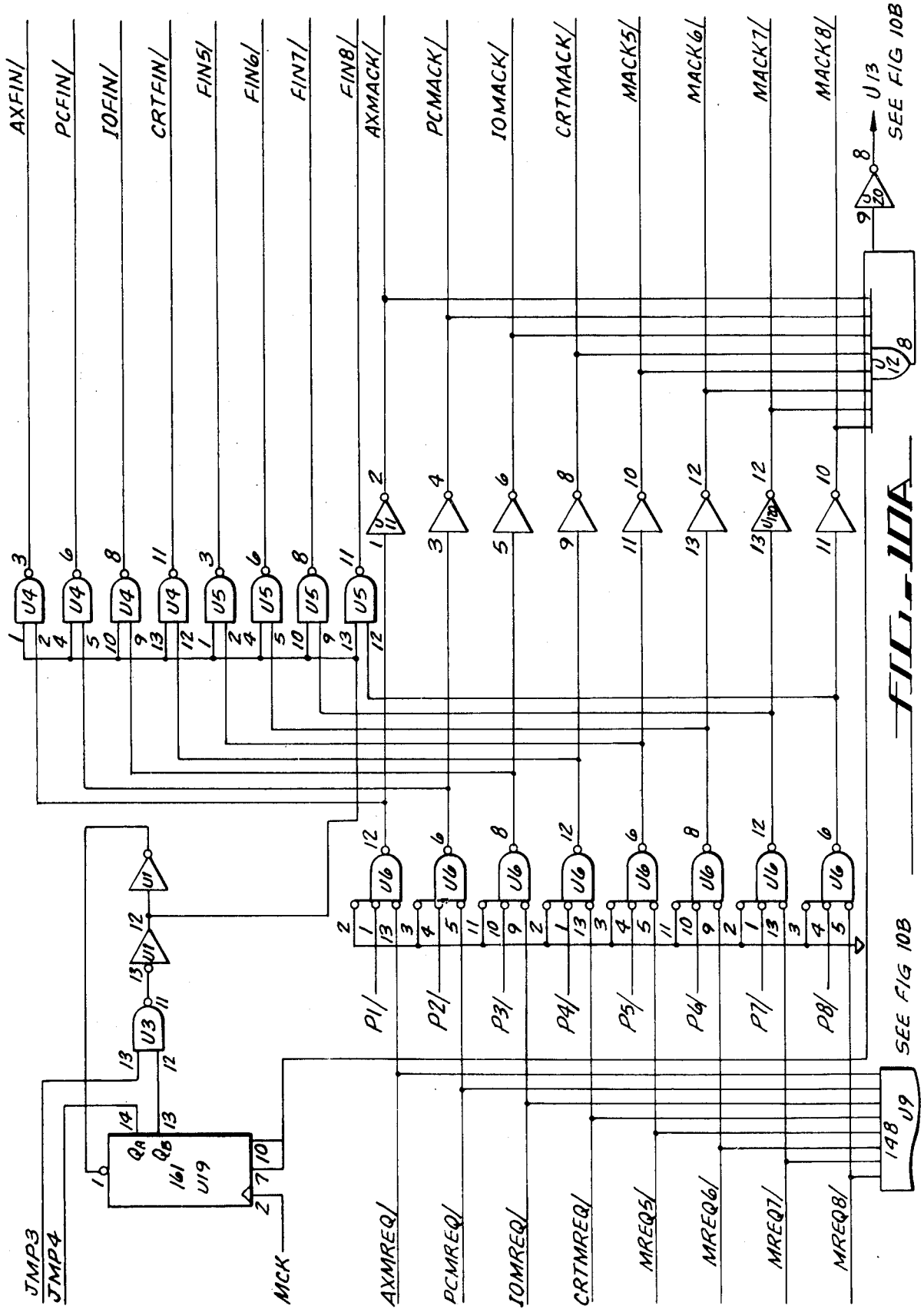
Figure 10B:
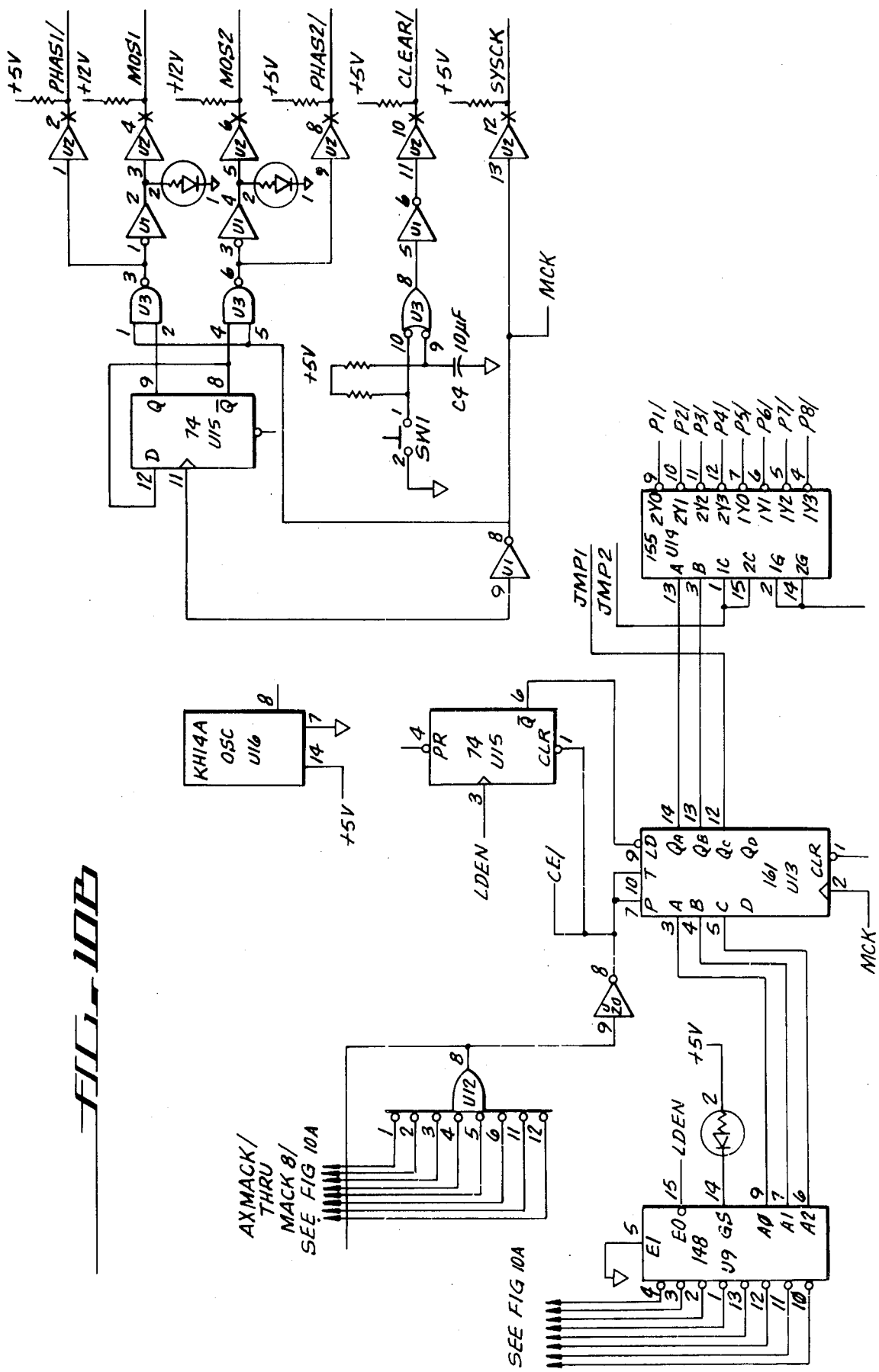

FIGS. 9, 10A and 10B are schematics of the common data memory. FIG. 9 is a schematic of the memory devices themselves. There are 16 1K (1024) by 1 bit RAM devices identified as U24 through U39. Because of the redundant nature of this memory only devices U24, U25, U32 and U33 are shown. Since the 16 bit devices are used in parallel, the capacity of this random access memory is 1K 16 bit words. The devices are addressed in parallel through addressing lines MADR0 through MADR9 which are received from the computer unit. Each device contributes one bit and an assembled 16 bit word is output on lines MBS0 through MBS15. Pin 11 of the device is both an input and an output and therefore the MBUS lines constitute a bi-directional 16 bit data bus communicating with the computer unit as shown in FIG. 8.

An additional two memory devices U18 and U17 are also provided in this common data memory schematic. U18 is a 1K by 1 bit RAM containing the status of all the "relay" bits used by the computers of this system. This device is also addressed by addressing lines MADR0 through MADR9 and the one bit input/output is communicated to the computer on line MBUS15.

Erasable PROM U17 is a 1K by 8 bit device erasable and programmable by the user to store various parameters of the individual machine that are relatively permanent but may change from time to time. These parameters include cutter offsets and servo stiffness slopes and break points. These are values that remain fixed for long periods of time but may be changed by the user from time to time to accommodate machine wear or a different mode of use. In its real time computations, the computer will need this data to compute the axis drive system 54 output. This device is also addressed through lines MADR0 through MADR9 and its output is supplied to the bi-directional data lines MBUS0 through MBUS7.

FIGS. 10A and 10B are schematics of the time-sharing logic associated with this memory. Eight ports enable the honoring of memory requests of up to eight microcomputers on request lines AXMREQ/ through MREQ8/. Only one computer at a time is actually accessing memory. The others are put on hold until the accessing becomes possible. If a request line is honored by an enabling signal on any one of the lines, P1 through P8, an acknowledge signal is returned to the computer on lines AXMACK/ through MACK8. The memory transaction will be executed and a finish signal will be received by the computer on one of lines AXFIN/ through FIN8/ to release the bus for some other computer. A three megacycle clock is generated by oscillator U16 and various clock pulses and synchronizing signals are generated in the associated logic.

FIGS. 11A through 11D, 12, and 13 are schematics of the axis controller logic board associated with the axis controller. The system clock is applied to gate 200 and 201, driving the MOD 1024 counter of FIG. 11C comprising counter devices 202, 203 and 204. The outputs are taken on line C1 through C10. A mod 3 counter comprising flip flops 205, 206 of FIG. 11C and the surrounding circuitry counts down the overflow bit of the mod 1024 counter, and the overflow of the mod 3 counter is in turn counted down by the mod 6 counter 207. The mod 3 and mod 6 counter output lines are C11 through C15. Shift registers 208 and 209 of FIG. 11A capture the states of the various counters and supply them to the rest of the circuit on lines AXX00 through AXX15.

Figure 11B:
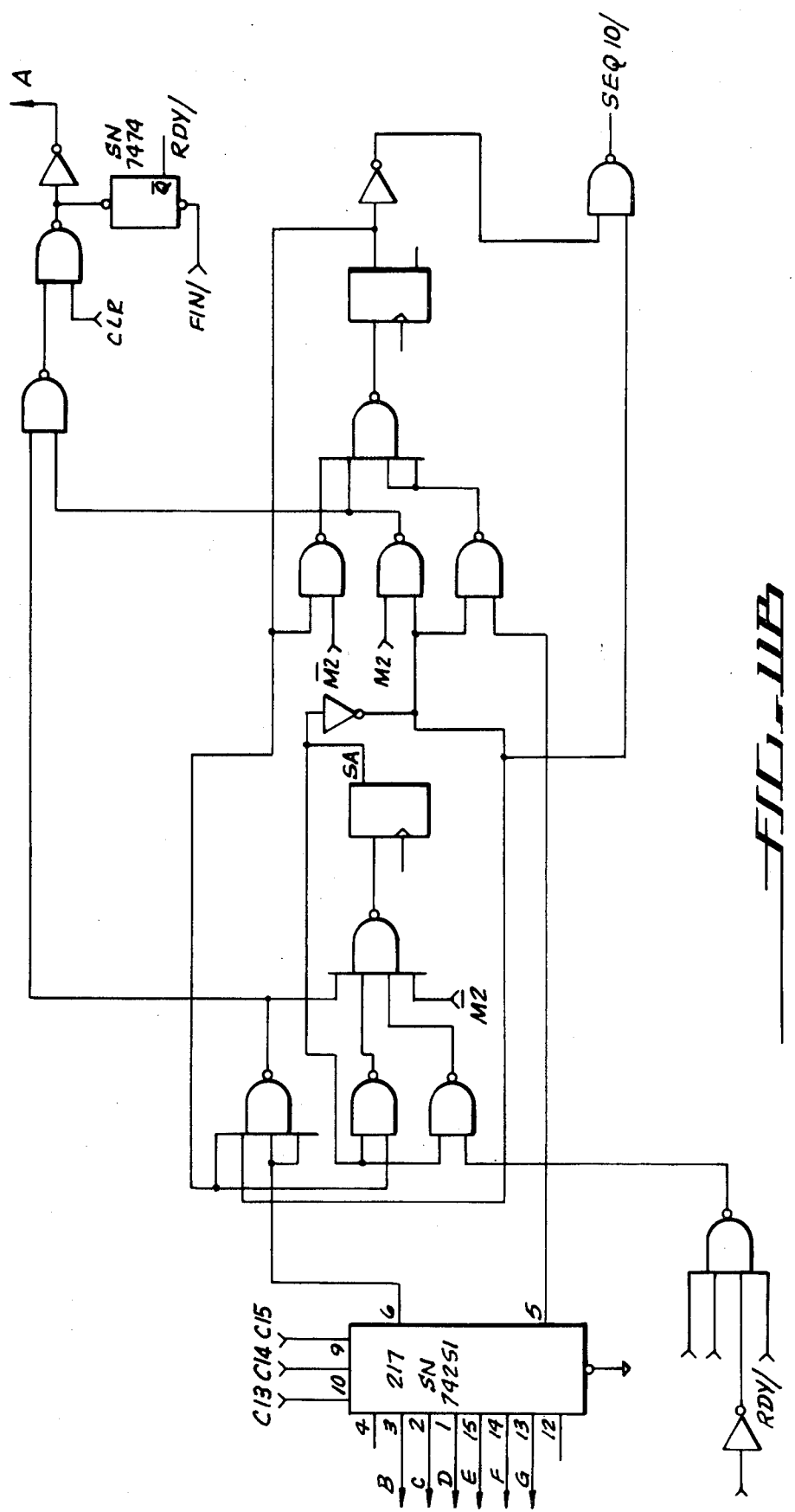

The sin ($\omega t + \phi$) sine waves from the six resolvers are filtered to remove extraneous noise and are applied to the inputs of zero crossing detectors 211 through 216 of FIG. 11D. The resultant square waves are applied simultaneously to multiplexer 217 of FIG. 11B which selects one based on the state of the mod 6 counter inputs C13, C14, and C15 of FIG. 11C. The selected axis zero crossing signal is supplied through sequencing circuits and is ultimately used to capture the state of the mod 1024 counter in devices 208 and 209, FIG. 11A, thus supplying for the selected axis a digital phase signal at lines AXX00 through AXX15 and simultaneously supplying a ready signal at line RDY/ to the remainder of the system.

FIG. 12 is a schematic of the read only memory device 65 and the two digital to analog converters 66 and 67 of FIG. 5. Output lines from the mod 1024 counter and mod 3 counter, C3 through C12, are applied to read only memory device U7 and two sets of four output lines drive the digital to analog converters resulting in a sine and cosine output.

FIGS. 13A and 13B are a detailed schematic of the sample and hold multiplexer. The velocity error computed by axis controller 118 of FIG. 1 is output on the AXX00 through AXX15 lines and is received at the inputs of registers of U26 and U27 of FIG. 13. This information is held at the register output lines, which are the input lines to the digital analog converter U50, long enough for the output line of the digital to analog converter, ANLOG1, to stabilize. This signal, when buffered through operational amplifier U57, becomes the input to FET switch devices U41 and U42 which are under control of a multiplexer U21 which is itself addressed by the computer on AXADRR0 through AXADRR3 address lines. Thus, a selected velocity error is routed through the multiplexer and switch arrangement to charge one capacitor selected from six capacitors C90 through C95. Since the charge time of these capacitors when the corresponding contact of device U41 or U42 are open, for all practical purposes C90 through C95 are continuously charged to an analog voltage value corresponding to the velocity error associated with each channel. This analog voltage is amplified through operational amplifiers U43 through U48 and sent out on lines CH0 through CH5 to the appropriate axis as the velocity error signal.

Functionally, when the axis controller receives position information from the path calculator it must accomplish several functions. It receives the axis information, computes the actual position, compares it to the commanded position, computes the position error, and outputs a drive signal to the appropriate axis, all of which takes considerable computer time. Therefore, the position is captured about once every sixth resolver sine wave cycle. The information is stored in the latch 75 of FIG. 5 and a discrete signal is supplied to the axis controller to indicate that data is available for that axis. When the axis controller takes notice of this discrete signal it reads a 16 bit word from the hardware through the X bus. One bit indicates that there is new data, three bits indicate the axis number and the lower ten bits give the state of the mod 1024 counter. Upon processing this data the computer resets the new data bit and then continues looking for new data from other axes. If no axis is ready, the computer does other housekeeping chores and continually polls the six axes for new data.

The output of the mod 6 counter is the three bits which identify the axis in the word described above. When the axis counter has specified the axis, then the zero crossing detectors 68 through 73 of FIG. 4 begin to look for a zero crossing in the specified axis. As described above, the sine waves are converted to square waves for this detection of the zero crossing time. The hardware waits until the signal from the zero crossing detectors goes from high to low and then captures the mod 1024 counter output as the lower ten bits of the latch 75 data as well as the state of the mod 6 counter which specifies the axis. The mod 3 counter provides several preparatory logic signals for timing purposes.

Having solved the input position problem, the axis controller then solves the output velocity problem. This requires the digital to analog converter of FIG. 13B which, with a 12 bit input, is settable to any one of 4,096 possible states ranging from plus to minus 10 volts. This one digital to analog converter output is sent out through any one of six channels in conjunction with the sample and hold circuits of FIG. 13A. Thus, the output is steered to the appropriate axis. In the preferred embodiment each axis is serviced every six milliseconds.

In addition to the basic D to A circuit of FIG. 13B, there is a SCALE line which changes the amplification factor of the operational amplifier U57 at the output of the D to A converter by a factor of four which effectively turns the D to A converter into a 14 bit device. Thus, at low speeds where greater servo stiffness is required, an increased multiplication is built into the circuit.

The information received from the input device is a series of part dimensions which are converted into a series of tool and part motions. These incremental motion commands, which are generated by the interpolator, are stored into common data memory along with an appropriate flag bit. These commands are loaded every several milliseconds and define the sum of motion to be produced. The software of the axis controller detects the new data bit, accumulates the new data into the old accumulation resulting in a total or absolute commanded position. The position actually traveled by the tool is also an accumulation of incremental positions that are calculated from the information received from the six sets of axis inputs from the machine tool and this gives an accumulation of the position actually moved.

These values are subtracted to produce a position error which is then used by the six axes as shown in FIGS. 13A and 13B. The schematics described above constitute a system capable of positioning the tool to cut smooth surfaces. However, the circuits do not have the capability of cutting threads since there is no provision for determining the spindle speed and angular position as a step preceding and necessary for the calculation of the next tool positioning command. FIGS. 14A, 14B, 15A, 15B and 16 are schematic diagrams of the tachometer and interrupt circuits used to generate this spindle speed and position information.

Figure 14A:
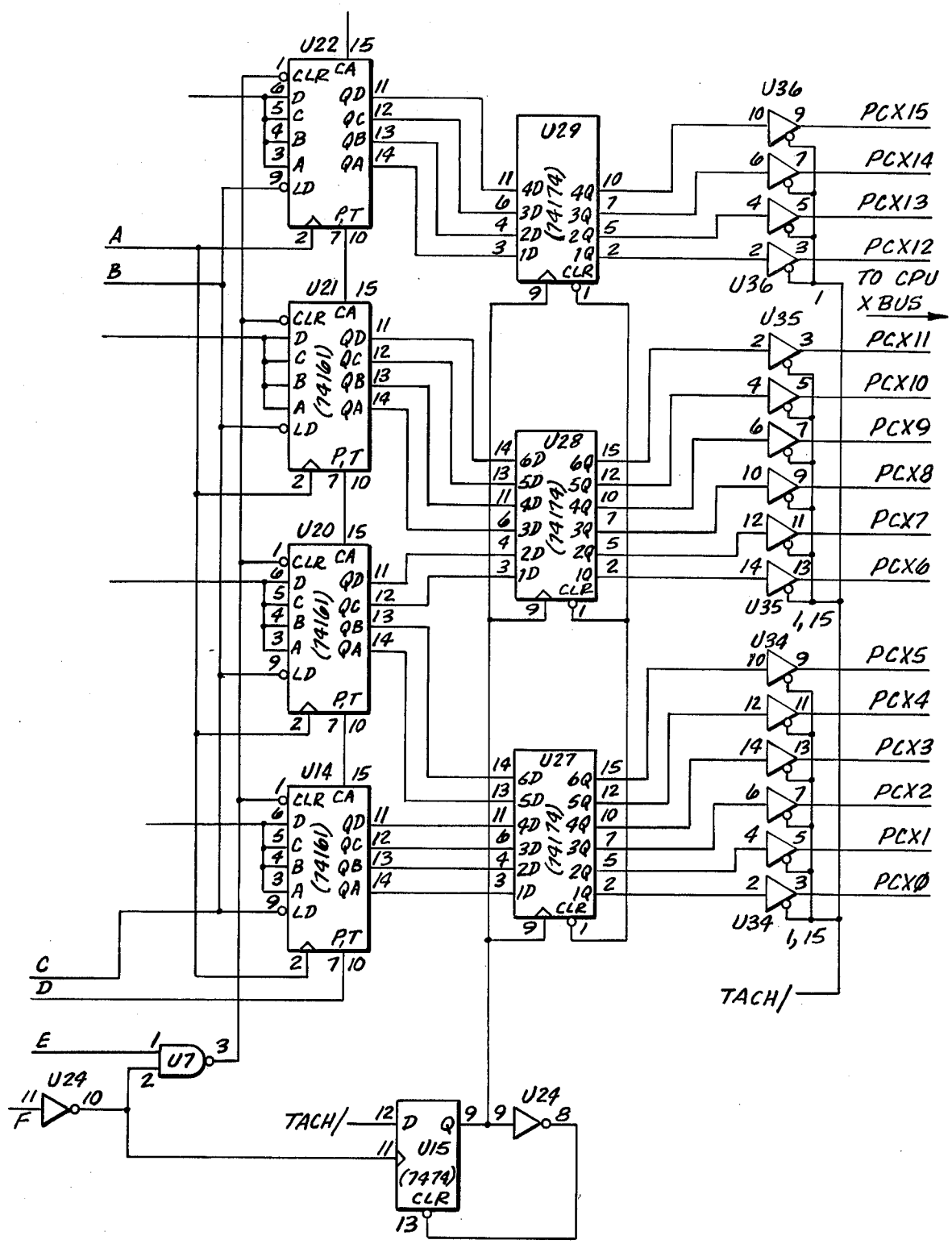
Figure 14B:
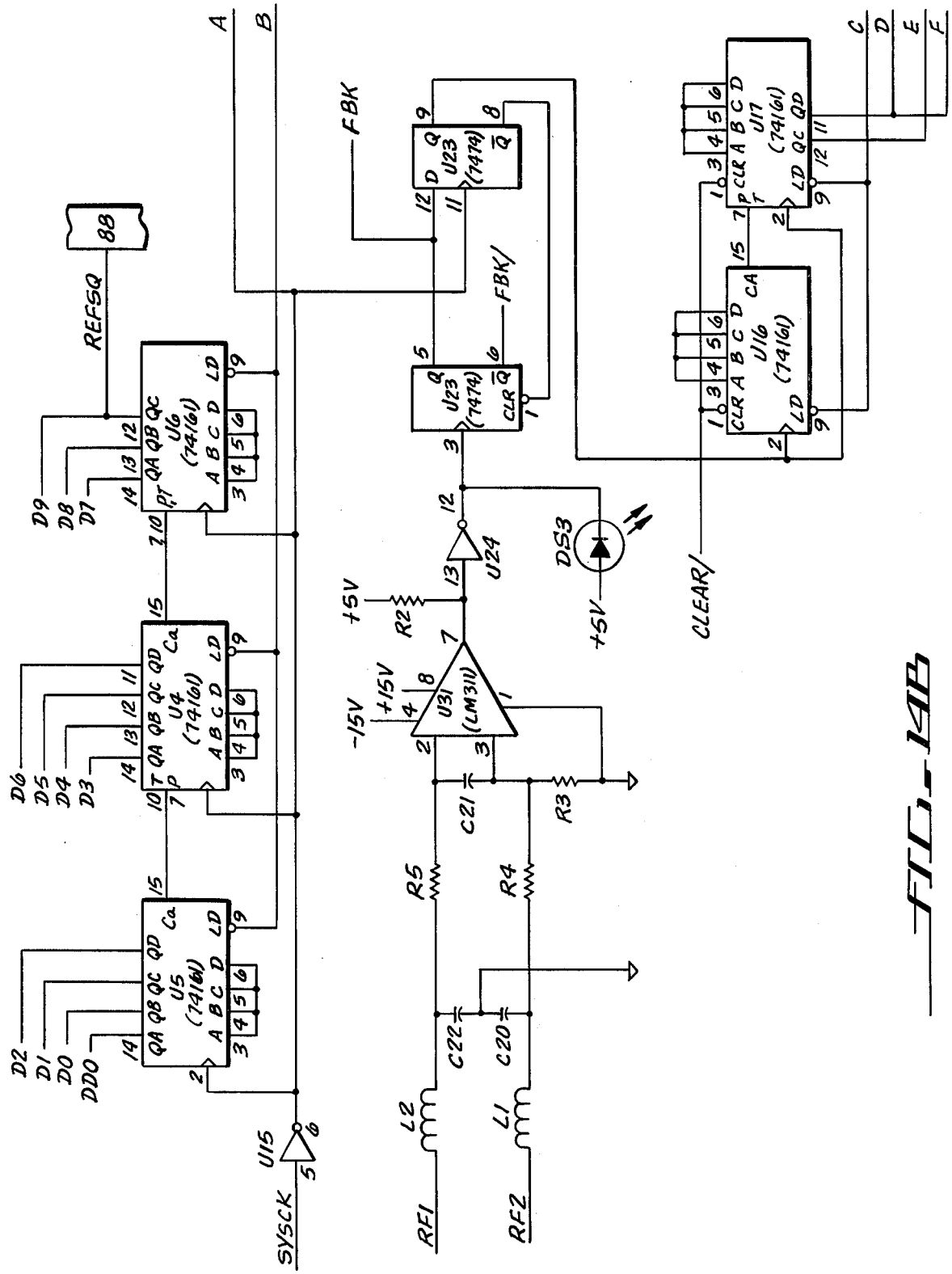

In FIG. 14A the system clock is transmitted through buffer U15 to the mod 1024 counter U4, U5 and U6 of FIG. 14B.

The outputs are used as inputs to two read only memory devices, the outputs of which are the sin $\omega t$ and cos $\omega t$ reference voltages applied to the inputs of the resolvers monitoring the motion of the lead screw axis. This count is also used to sync the axis controller sine wave generator so that both circuits can use it.

The output of the resolver is received by input lines RF1 and RF2 of FIG. 14B at a filter network comprising coils L1 and L2 and capacitors C20 and C22 which filters out any transients that may be on the line before application to the zero crossing detector U31. The filter prior to the input to this device is necessary since noise on the line may create double crossing signals which would make the system inoperative. The output of the zero crossing detector is fed into a mod 256 counter, U16 and U17, which is used to produce the basic timing signals for the tachometer.

The tachometer in FIG. 14A comprises a 16 bit counter, U14, U20, U21 and U22 which loads its output into latches U27, U28 and U29. The 16 bit counter is driven by the system clock and is allowed to count the clock pulses occurring between outputs of the zero crossing detector U31 of FIG. 14B. The total count loaded into the latch circuits and ultimately passed through buffering circuits U34, U35 and U36 to the computer X bus is a function of the period of the spindle and the number of pulses counted by the tachometer is directly related to the amount of time required for the spindle axis to make one complete rotation. Thus, spindle speed information is supplied to the interpolator.

The spindle may be driven in either direction and in either case the input to the zero crossing detector U31 of FIG. 14B will be a sine wave. The counter resolver feedback and tachometer circuits work equally well in either direction.

As a numerical example, in order for the interpolator to produce a position command every 15 milliseconds, and assuming 300 RPM's at the spindle, an interrupt would be required every 0.075 revolutions of the spindle. The spindle is divided into 1,024 segments and the computer will pick one segment close to the position 0.075 revolutions from the last interrupt to use as a timing reference for producing the next position command.

Output tachometer information is stored in latches U27, U28 and U29, FIG. 14A, and is continuously available to the computer X bus except at times when the latch information is being updated. The computer interrogates these latches on line TACH/ which enables the data to be put onto the X bus.

Figure 15B:
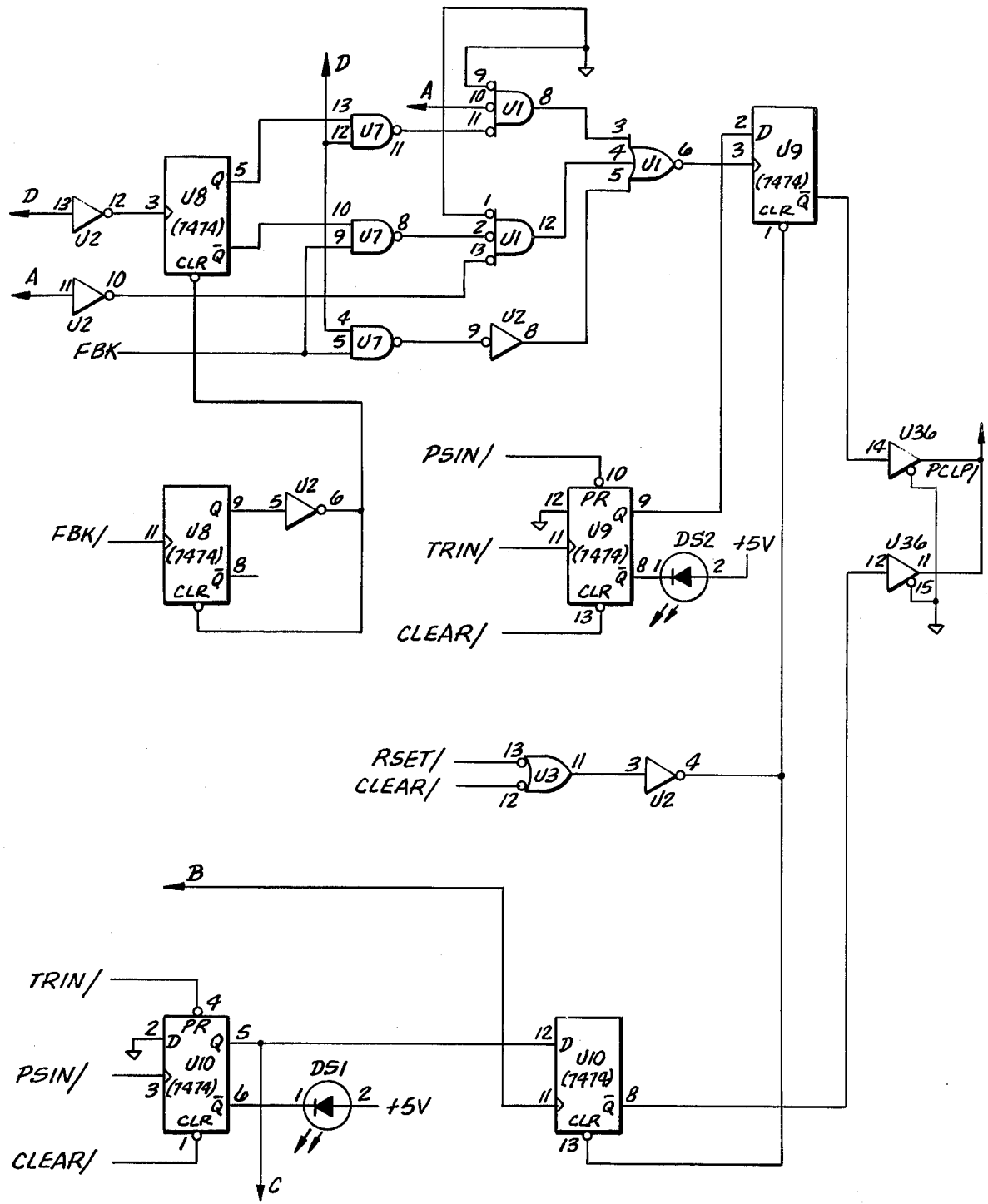

FIGS. 15A and 15B are schematics of the circuit that produces the actual interrupt signal based on both position and time. Ten lines of position information are received from the computer on lines PX0 through PX9 in FIG. 15A and correspond to the rotational position of the axis at which point the computer has decided it will issue the next packet of motion sample data to the axis controller controlling the cutting tool position. This ten bit word indicates to the circuit one of 1024 possible locations of rotational position at which the next interrupt should occur. Line PX10 is a sign bit and indicates the direction of motion of the spindle.

Simultaneously, 10 bits of data are received on lines D0 through D9 from the 10 bit counter of FIG. 14B which is the counter used to drive the read only memory devices, ultimately resulting in reference sine and cosine waves being sent to the resolver. This count is a count that goes from 0 to 1024 each reference cycle at a rate of 3125 cycles per second. This changing pulse count is applied to comparison gates U11, U12, and U13 of FIG. 15A along with the 10 bits of interrupt data from the computer which is latched through devices U25 and U26. Upon the presentation of a perfect match, a pulse will be generated at the output of U13 indicating that the instantaneous spindle rotational position and the position at which an interrupt is desired are identical.

The timing of each pulse in relation to the reference data received on lines D0 through D9 is a function of the spindle position where, for instance, if the spindle is at the zero reference point, the pulse output from device U13 will occur at the beginning of the 1024 count whereas, as the spindle approaches 360°, the pulse will fall on that part of the reference cycle approaching a count of 1024.

This series of pulses is fed to the position interrupt circuit along with a feedback pulse FBK or FBK/ which is generated by the resolver feedback circuit of FIG. 14B. The feedback pulse is similar to the position request pulse output of U13 in that both are pulses and both may occur at any position corresponding to a count of from 0 to 1024 received on lines D0 through D9. The essence of the relationship between these pulses is that when the position request pulse occurs simultaneously with the feedback pulse, then the spindle position which is a function of the feedback pulse is exactly equal to the position at which the computer requested an interrupt. The position interrupt circuit therefore is a circuit for generating an interrupt when there is an identity of these two values. The problem is that as the spindle rotates at high speeds, the spindle may be one pulse before the requested position on one sample and one pulse after the requested position on the next sample. Thus, it is not practical to look for a direct match but, instead, the circuit looks for either two position request pulses or zero position request pulses occurring between feedback pulses. This is accomplished in the position interrupt circuit comprising the upper half of flip-flop U8 and gates U7 and U1 of FIG. 15B where a direction signal received from line PX10 through device U25 of FIG. 15A indicates to the circuit the direction of spindle rotation and therefore indicates to the circuit whether zero or two position request pulses will be received between feedback pulses. The position request pulses are generated by a perfect match generated at U13 and the feedback signals are received at lines FBK and FBK/. This position interrupt steers the output so that an interrupt will be generated when the appropriate number of position requests between feedback pulses is received, ultimately generating a low priority interrupt on line PCLP/. The two halves of flip-flop U9, FIG. 15B, operate such that when the upper half of U9 generates an interrupt, the computer will acknowledge the receipt of that interrupt by sending a signal to the lower half of U9 on TRIN/which resets the upper half of the flip flop pair, thus allowing the computer to respond only once to the generation of each interrupt. The lower circuit is a timer interrupt generating interrupts on a time, as opposed to position, basis. This operates as a normal interrupt circuit and is not used during the thread cutting process.

FIG. 16 is a processor interface which receives information from the computer X bus on lines PCX0 through PX11. This interface also receives system status information from the computer and generates therefrom signals commanding an interrogation of the tachometer TACH/, a reset RSET/, a position interrupt mode which is the one that is used in thread cutting PSIN/ and a timer interrupt mode TRIN/.

While an exemplary embodiment of this invention has been described above and shown in the accompanying drawings, it is to be understood that such embodiment is merely illustrative of, and not restrictive on, the broad invention and that we do not wish to be limited in our invention to the specific construction or arrangement described and shown, for various obvious modifications may occur to persons having ordinary skill in the art.

We claim:

1. A numerical control system for controlling a machine tool to cut threads in a part mounted on a spindle with a cutting tool mounted on a leadscrew comprising:
   a spindle resolver mounted on said spindle for generating electrical spindle angular position signals, the phase of each being a function of said spindle angular position,
   interpolator means for computing the spindle speed from said angular position signals, for determining from said spindle speed, the position of the spindle at the time of the next position command, and for computing a digital motion signal for said cutting tool as a function of said spindle speed and said time of the next position command, and
   axis controller means responsive to said motion signal for driving said leadscrew to the commanded position.

2. The apparatus of claim 1 further comprising a tape reader for generating and transmitting to said interpolator digital data describing the threads to be cut.

3. The apparatus of claim 2 wherein said axis controller means further comprises
   an axis controller for receiving said motion signal and converting it into a digital position command, and
   a servo circuit for driving said leadscrew to the position commanded by said axis controller.

4. The apparatus of claim 3 wherein said interpolator means includes
   tachometer means for receiving said angular position signals, and for computing from the change of phase as a function of time the spindle speed,
   an interpolator computing means for receiving said spindle speed and position information and said tape reader data and for computing the position of the spindle at the time of the next position command, and for computing from said spindle speed and position information a digital motion signal for said cutting tool, and
   an interrupt means for initiating the transmission of said motion signal to said axis controller means when the spindle position as indicated by said angular position signal is substantially equal to the position computed by said interpolator means.

5. The apparatus of claim 4 further comprising
a leadscrew resolver rotatably coupled to said leadscrew for generating an electrical leadscrew angular position signal, and
wherein said servo circuit further comprises a leadscrew resolver zero crossing detector means for continuously converting said leadscrew position signal into a digital representation thereof and
a servo summing junction for comparing said digital representation to said digital position command to form a digital difference signal, and wherein said servo circuit drives said leadscrew at a speed proportional to said difference signal.

6. The apparatus of claim 5 wherein said interpolator means further comprises a spindle resolver detector means for continuously converting said spindle position signal into a digital representation thereof, and transmitting said digital representation to said tachometer, said interrupt means and said interpolator computing means.

7. The apparatus of claim 6 wherein said interpolator computing means comprises a computer.

8. The apparatus of claim 7 wherein said axis controller means comprises a computer.

9. The method of using a numerical control system to control a machine tool to cut threads in a part mounted on the machine tool spindle with a cutting tool mounted on a leadscrew comprising the steps of,
determining said spindle angular position and speed
computing the angular position of said spindle at the time of the next position command, where said position commands are issued at a pre-determined frequency,
computing the magnitude of the next position command,
transmitting said next position command to a servo circuit when the actual position is substantially equal to said computed position of said spindle, and
using a servo circuit to drive the leadscrew and cutting tool to the commanded position.

10. The method of claim 9 wherein the step of determining the spindle speed and angular position comprises the steps of
using a resolver coupled to said spindle to produce a sine wave, the phase of which is a function of said spindle angular position,
digitizing said spindle angular position through the use of a zero crossing detector, and
measuring the time between zero crossings to determine said spindle speed.

* * * * *

UNITED STATES PATENT OFFICE
CERTIFICATE OF CORRECTION

PATENT NO. : 4,079,235
DATED : March 14, 1978
INVENTOR(S) : Stanley G. Froyd et al.

It is certified that error appears in the above-identified patent and that said Letters Patent are hereby corrected as shown below:

Column 8, line 56, delete the numeral [161] and insert the numeral 16 therefor;

Column 10, line 8, delete [pulse] and insert phases therefor.

Signed and Sealed this

Fifteenth Day of August 1978

[SEAL]

Attest:

RUTH C. MASON
Attesting Officer

DONALD W. BANNER
Commissioner of Patents and Trademarks